J. W. HALEY & C. B. YELTON.
LUMBER REGISTER.
APPLICATION FILED SEPT. 13, 1916.

1,274,412.

Patented Aug. 6, 1918.
15 SHEETS—SHEET 1.

Witnesses
J. R. Dunlay
M. A. Williams

J. W. Haley
and
C. B. Yelton
Inventors by C. A. Snow & Co.
Attorneys.

J. W. HALEY & C. B. YELTON.
LUMBER REGISTER.
APPLICATION FILED SEPT. 13, 1916.

1,274,412.

Patented Aug. 6, 1918.
15 SHEETS—SHEET 2.

J. W. Haley and
C. B. Yelton
Inventors

Witnesses by C. A. Snow & Co.
Attorneys

J. W. HALEY & C. B. YELTON.
LUMBER REGISTER.
APPLICATION FILED SEPT. 13, 1916.

1,274,412.

Patented Aug. 6, 1918.
15 SHEETS—SHEET 3.

Witnesses

Inventors
J. W. Haley and
C. B. Yelton by C. A. Snow & Co.
Attorneys.

J. W. HALEY & C. B. YELTON.
LUMBER REGISTER.
APPLICATION FILED SEPT. 13, 1916.

1,274,412.

Patented Aug. 6, 1918.
15 SHEETS—SHEET 6.

Witnesses

Inventors
J. W. Haley
C. B. Yelton
by
Attorneys.

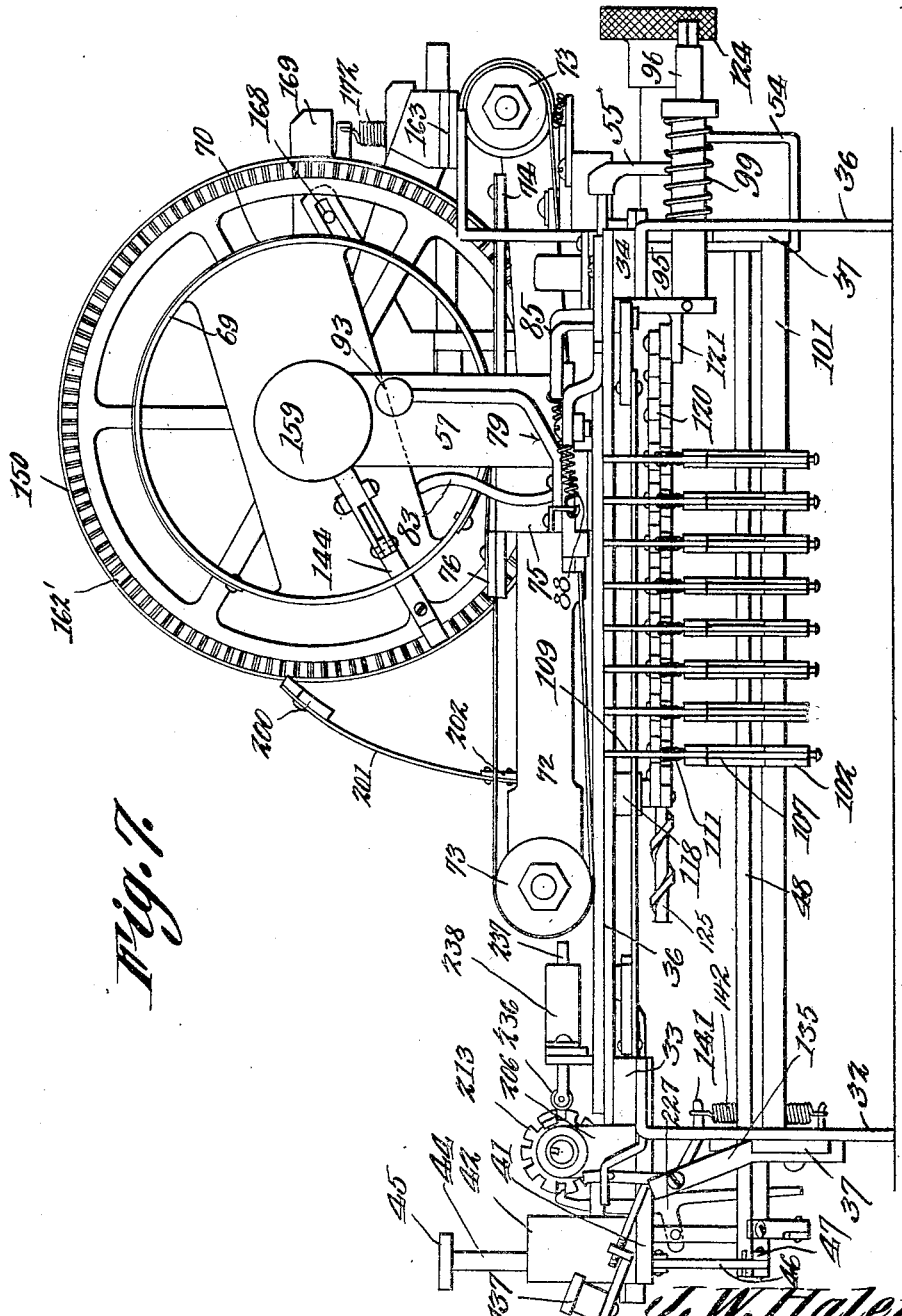

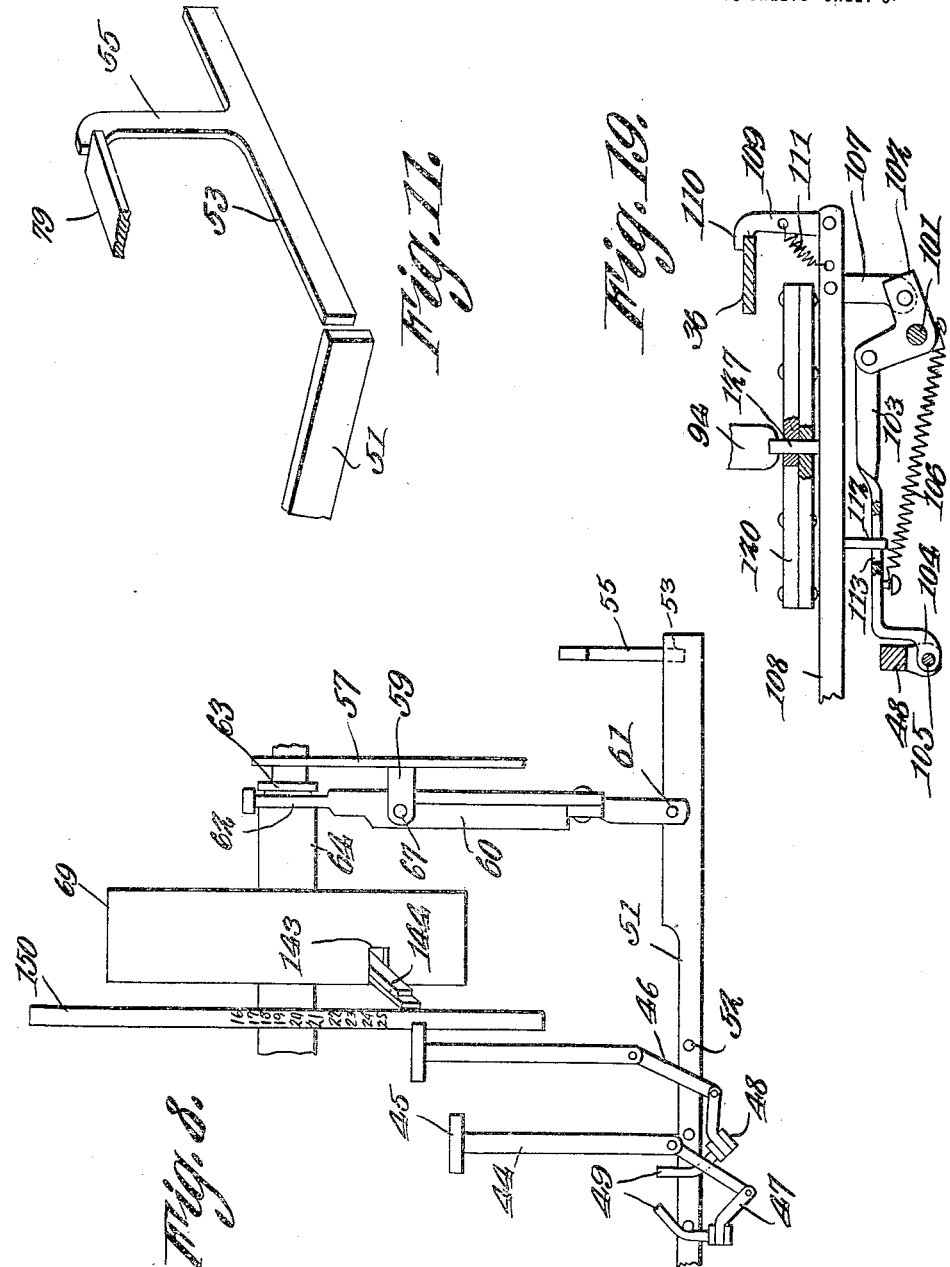

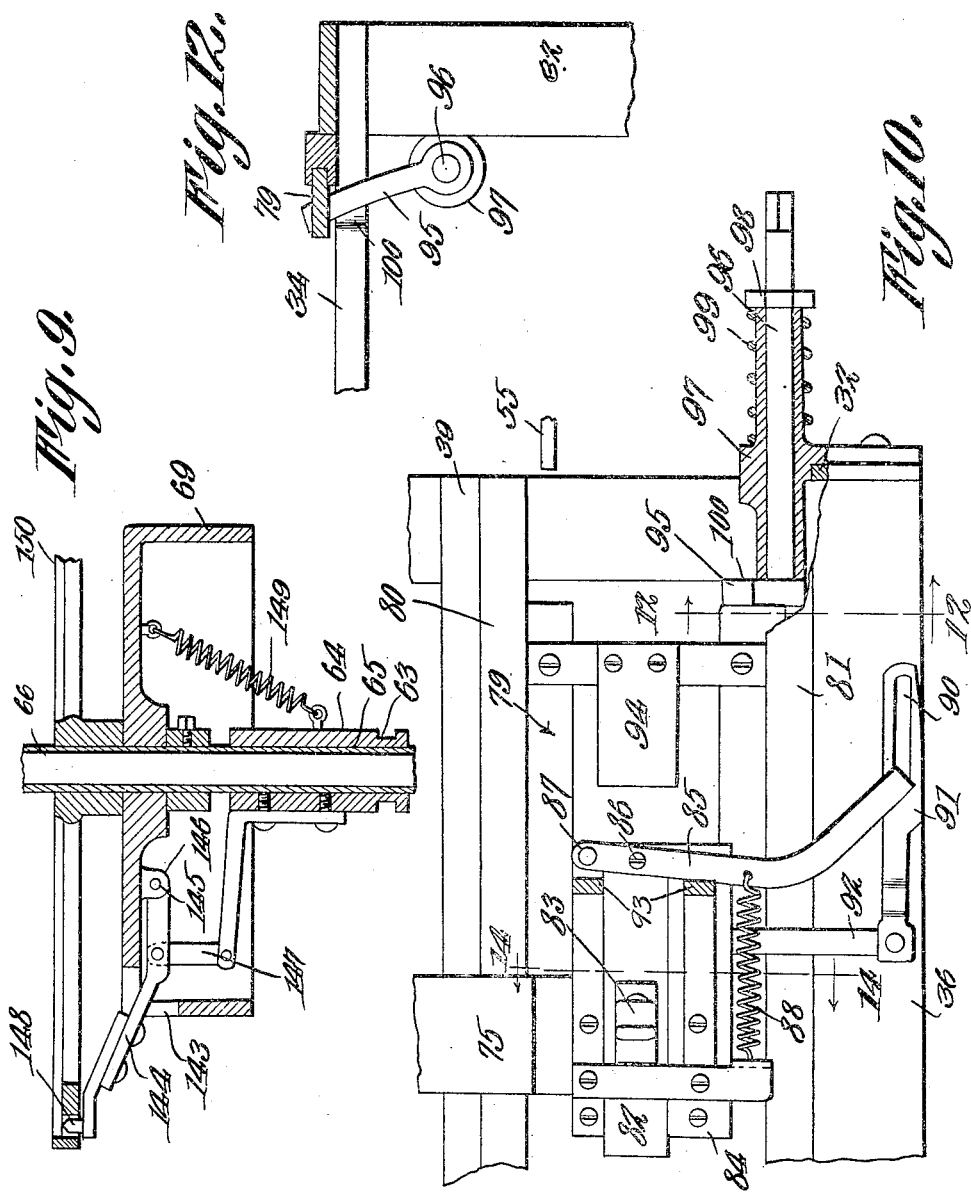

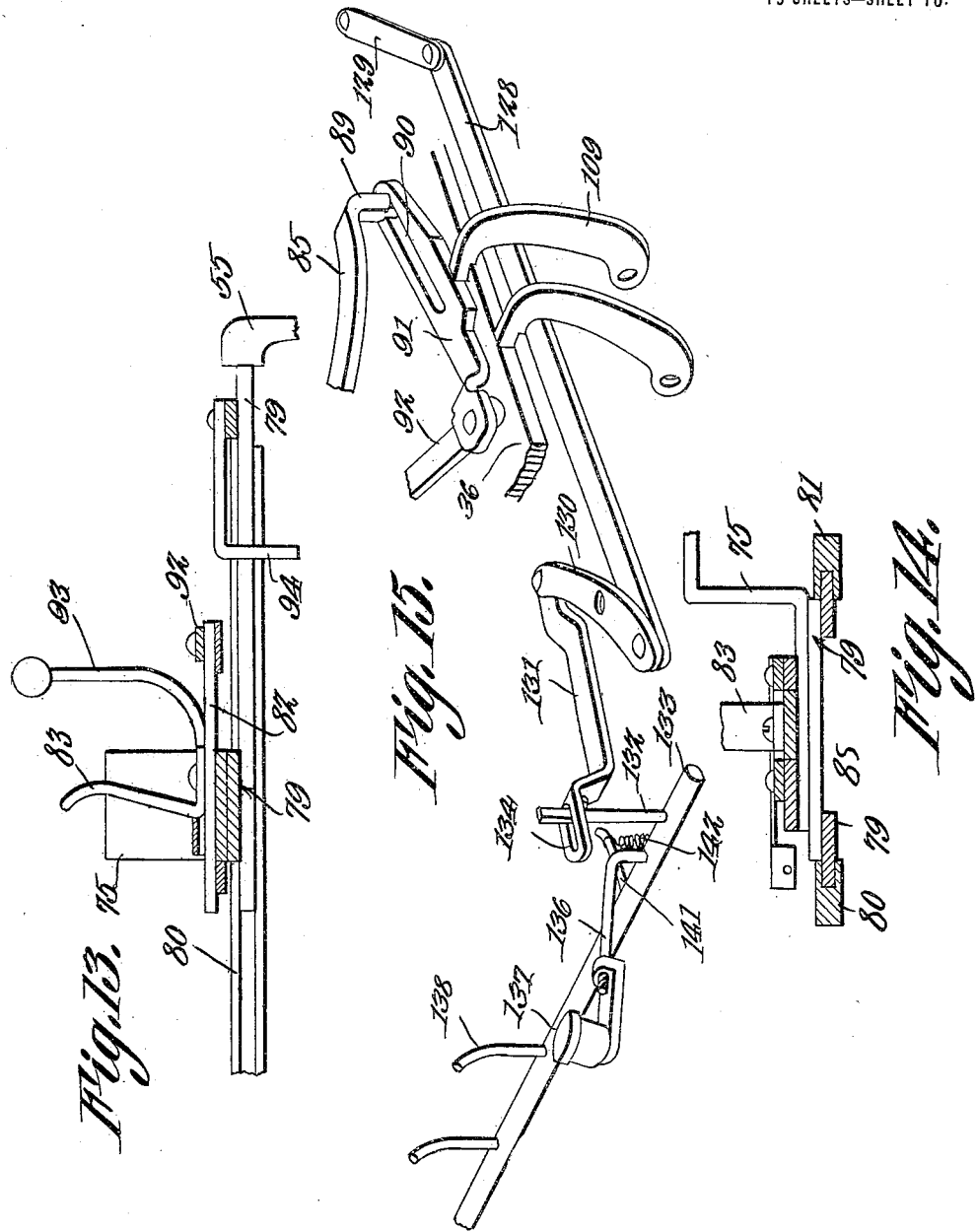

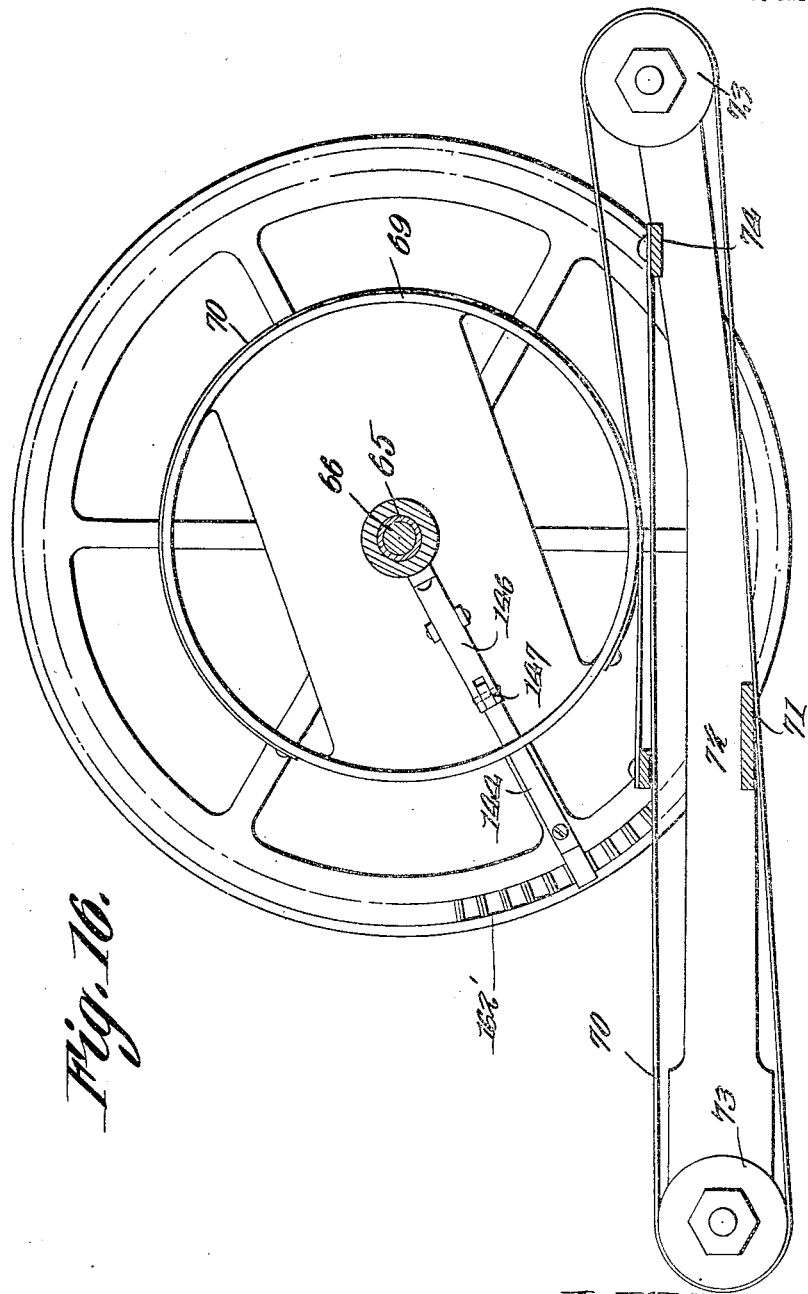

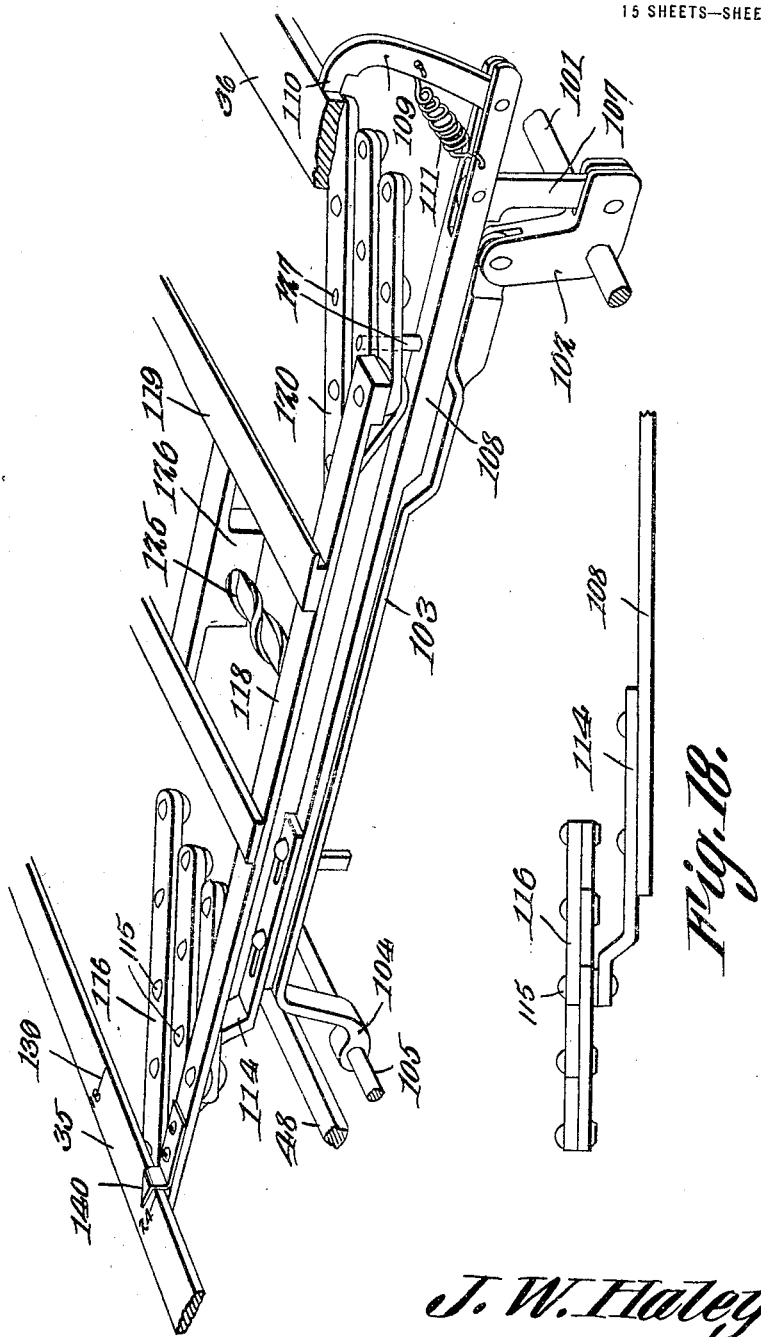

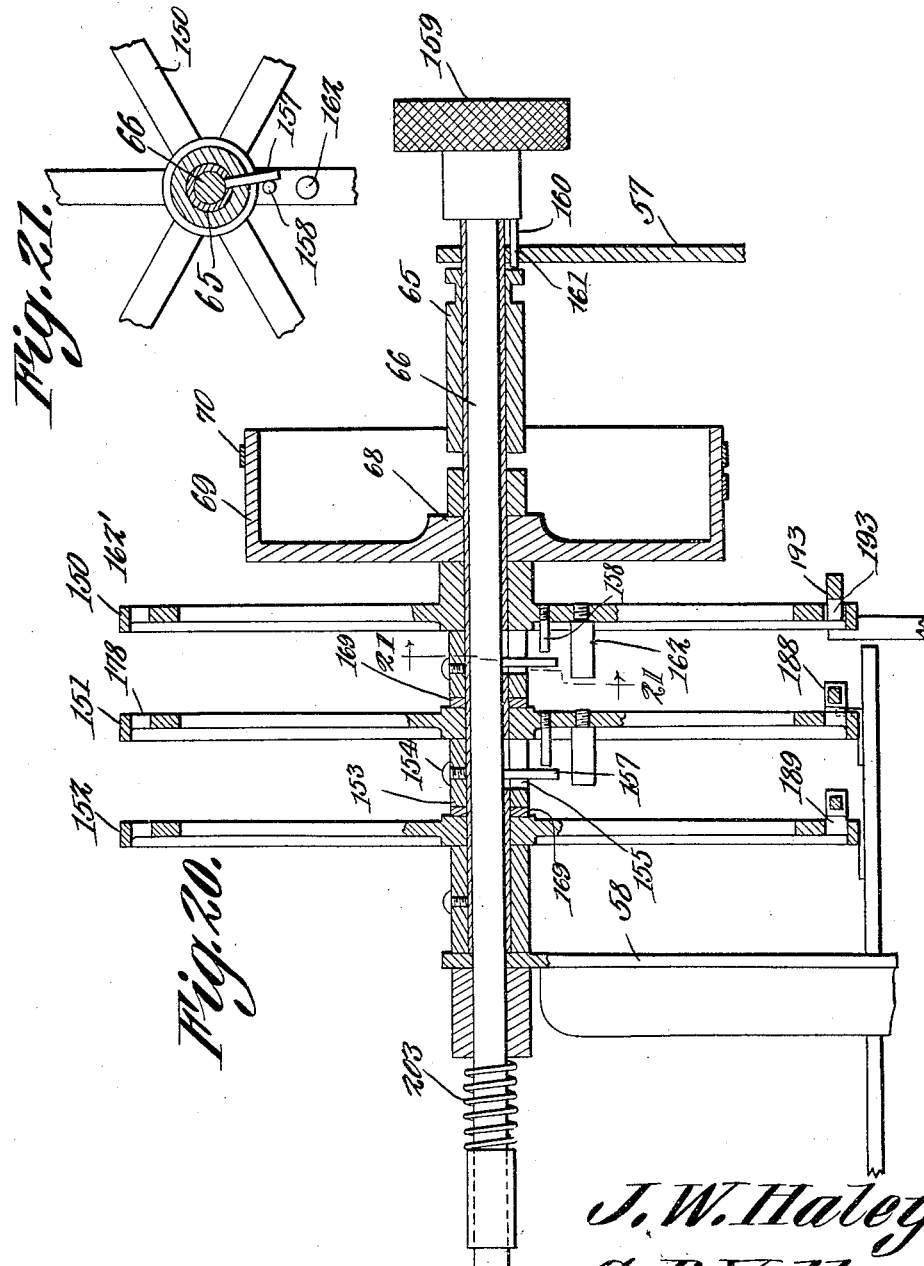

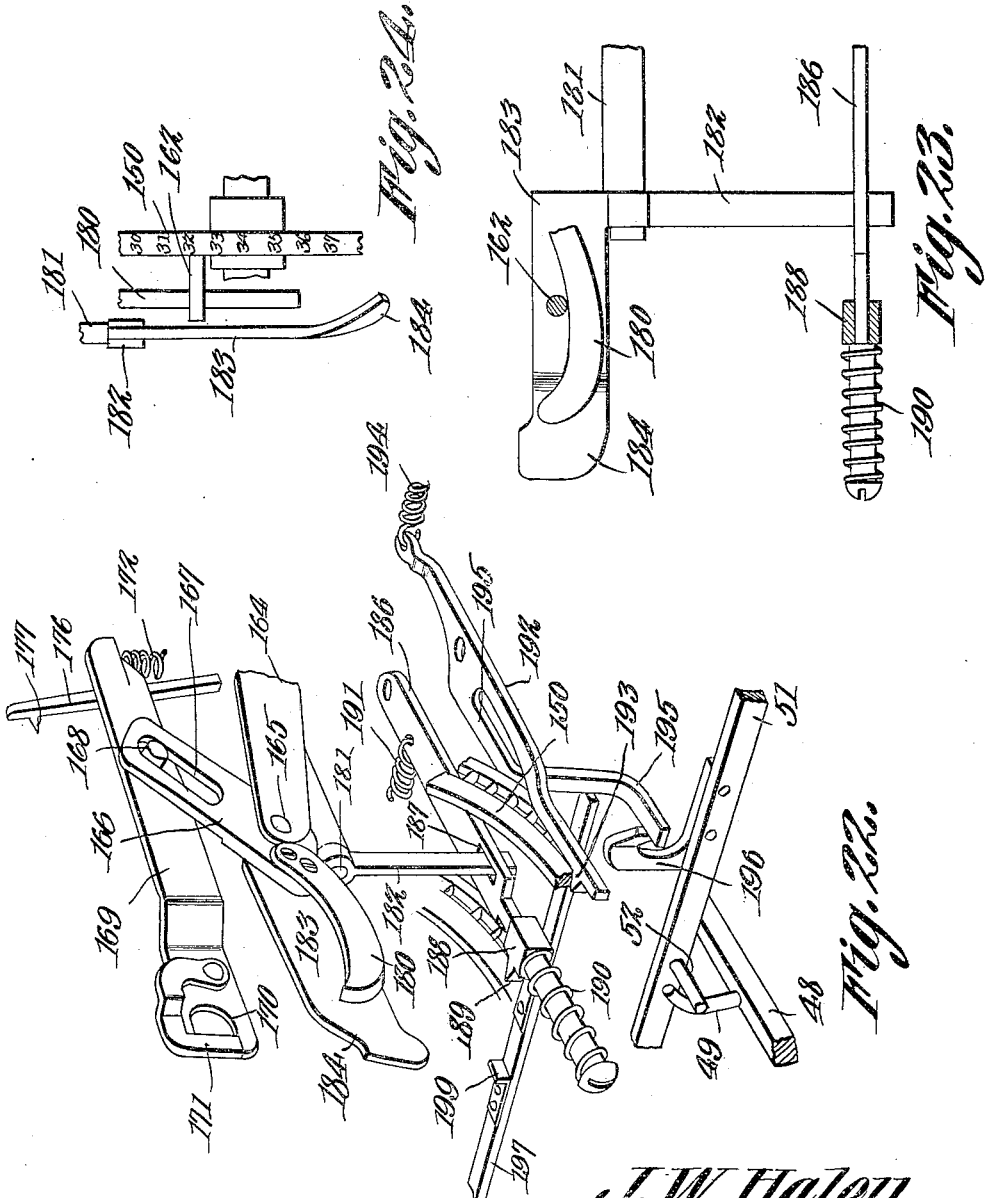

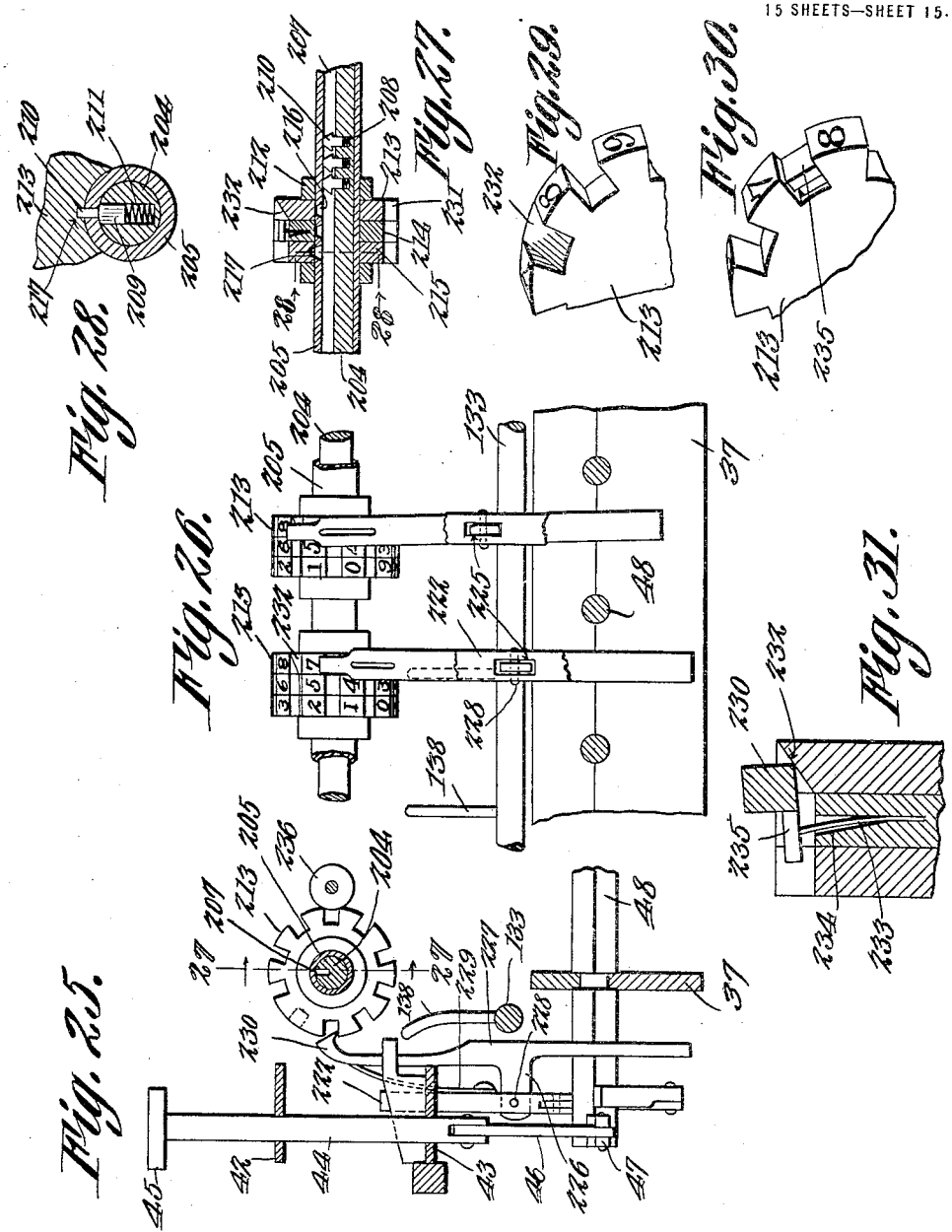

UNITED STATES PATENT OFFICE.

JOSEPH WILLIAM HALEY AND CHARLES BRAMBLE YELTON, OF ERLANGER, KENTUCKY.

LUMBER-REGISTER.

1,274,412.     Specification of Letters Patent.     Patented Aug. 6, 1918.

Application filed September 13, 1916. Serial No. 119,914.

*To all whom it may concern:*

Be it known that we, JOSEPH W. HALEY and CHARLES B. YELTON, citizens of the United States, residing at Erlanger, in the county of Kenton, State of Kentucky, have invented a new and useful Lumber-Register, of which the following is a specification.

This invention relates to machines for registering and tallying lumber such as flooring, ceiling, partition, siding and any other lumber that comes at certain standard widths and lengths. Lumber of this kind is usually tied in bunches. Flooring, ceiling and partition lumber usually comes four inches wide and six pieces in a bunch which is equal to one piece of lumber twenty-four inches wide and is also equal to one piece of lumber one foot in width but twice the length of the pieces forming the bunch. Should the pieces constituting the bundle be six feet long, then the total area of the bundle would be twelve feet board measure. Should the pieces be eight feet long, then the board measure of the entire bundle would be sixteen feet, etc. Six inch flooring is usually tied five pieces to a bunch which is equal to one piece thirty inches wide and is also equal to one piece a foot wide but two and a half times the length of the pieces of flooring forming the bundle. Thin ceiling is usually tied nine pieces to each bunch, which is equal to one board thirty six inches wide, where the pieces of ceiling are four inches in width and also equals a single board one foot in length but three times as long as the pieces of ceiling in the bunch. Thus the calculation of board measure of the contents of bundles of different kinds of lumber can be carried out and it is upon this basis of board lengths of bundles that the present invention is established.

One of the objects of the present invention is to provide mechanism which can be operated by anyone capable of recognizing numerals and which will total up the number of bundles of each length being handled and also the total board lengths, simple and efficient means being employed whereby the total board lengths of a bundle of any predetermined length made up of pieces of any standard width will be automatically determined and totaled.

It might be stated that it has been the practice heretofore to employ a high salaried reliable man at every point where lumber has been loaded or unloaded. It has been the duty of this man to keep tally upon the board lengths of lumber loaded or unloaded and the operation has been one in which it has been difficult to avoid mistakes. For example, where it has been necessary to remove so many thousand feet of lumber from a car, leaving a balance to be reconsigned to another point, it has been the practice to have bundles of lumber removed from the car and as each bundle is removed the length has been called out and the tally man has checked each length in its proper column. When he has estimated that some where near the proper amount of lumber has been removed, the operation is halted while the tally man engages in adding up the number of bunches of each length and then calculating the foot length of the total. If the foot length is less than that to be delivered, additional bundles must be removed from the car or, if more than enough bundles have been removed the surplus must be returned to the car. This in turn requires additional figuring as well as loss of time and labor by the help and, consequently, entails considerable expense to the shipper. Further expense is entailed by the frequent mistakes made in hastily figuring the lumber at the various points of loading and unloading.

The present invention has been devised as a means whereby all of the difficulties heretofore experienced in keeping a correct tally upon lumber are overcome and as the bundles are loaded or unloaded the machine will accurately tally the number of bundles handled and also the total amount of lumber in foot length.

A further object is to provide mechanism which can be handled by any one having a knowledge of figures, but as no mental calculations are required it is not necessary to employ a high salaried man for this purpose. Furthermore the person operating the machine can determine immediately when the desired length of lumber has been loaded or unloaded so that the time heretofore wasted while the help has been awaiting the calculations by the tally man, is saved and the loading and unloading materially expedited with practically no danger of mistakes being made.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Fig. 7 is an elevation of the other side thereof.

Fig. 8 is a front elevation of certain of the keys and the dog shifting mechanism controlled thereby.

Fig. 9 is a central section through the dog carrying drum and adjacent parts.

Fig. 10 is a plan view of the shifting carriage, the upstanding grip thereof being broken away and the bearing of the locking button being shown in section.

Fig. 11 is a perspective view of the carriage controlled latch and adjacent parts.

Fig. 12 is a section on line 12—12 Fig. 10.

Fig. 13 is a vertical longitudinal section through a portion of the carriage, certain adjoining parts of the machine being shown.

Fig. 14 is a vertical transverse section on line 14—14 Fig. 10.

Fig. 15 is a perspective view of the key releasing mechanism.

Fig. 16 is a side elevation of the shifting drum and adjacent wheel and showing the coupling band connected to the drum, portions of the carriage to which the band is attached being shown in section and the supporting shaft of the drum and wheel being also shown in section, said section being taken on the line 16—16 of Fig. 4.

Fig. 17 is a perspective view of a portion of the adjustable stop mechanism.

Fig. 18 is an elevation of one of the cross bars of the adjustable stop mechanism.

Fig. 19 is a vertical transverse section through a portion of the stop mechanism and showing a stop pin projected upwardly into carriage engaging position, the depending ear on the carriage being shown in engagement with the pin.

Fig. 20 is an enlarged vertical transverse section through the lumber adding wheels and adjacent parts.

Fig. 21 is a section on line 21—21 Fig. 20.

Fig. 22 is a perspective view of the means employed for transmitting motion from one adding wheel to another.

Fig. 23 is a side elevation of a portion of the mechanism shown in Fig. 22, the holding dog being shown in section.

Fig. 24 is a plan view of the shifting wing and adjacent parts shown in Fig. 23, a portion of the periphery of the adjacent adding wheel being shown.

Fig. 25 is an enlarged view partly in section and partly in elevation and showing the connection between one of the keys and the tally mechanism.

Fig. 26 is a view partly in elevation and partly in section of portions of the tally mechanism.

Fig. 27 is a section on line 27—27 Fig. 25.

Fig. 28 is an enlarged section on line 28—28 Fig. 27 and showing one of the coupling pins in engagement with a tally wheel.

Fig. 29 is an enlarged perspective view of a portion of the first tally wheel of a group.

Fig. 30 is a perspective view of a portion of the intermediate tally wheel of a group.

Fig. 31 is an enlarged transverse section through portions of the tally wheels of a group and showing the relative positions of the parts while being coupled together to cause rotation of the third wheel by the actuating pawl.

Figure 1:
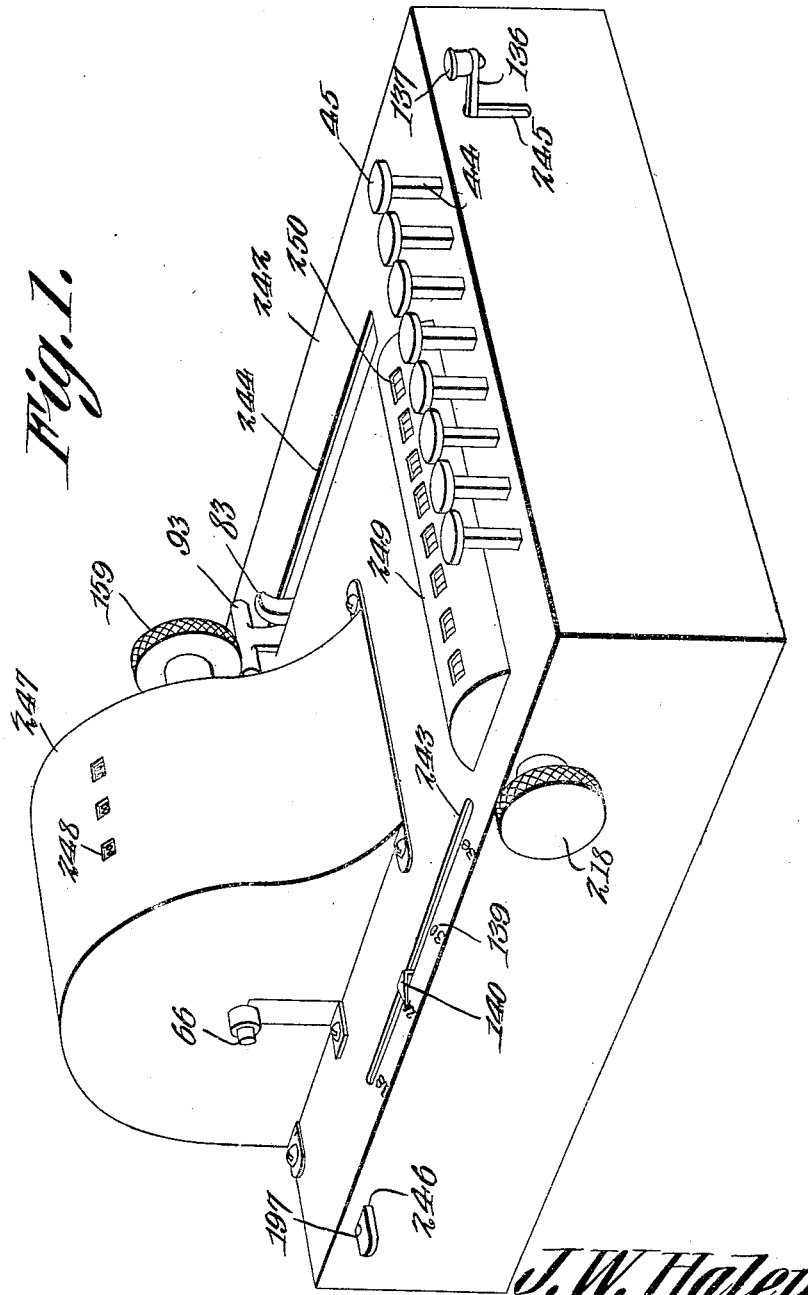
Figure 1 is a perspective view of the machine as it appears housed and ready for use.

Referring to the figures by characters of reference 32 designates the legs carrying the holding frame of the mechanism, these legs being connected at their upper ends to front and rear bars 33 and 34 and to side bars 35 and 36. In addition to these connections, the front legs are connected by a front strip 37 and the rear legs are connected by a rear strip 38. Furthermore the front and rear bars 33 and 34 are connected by longitudinal guide strips 39 and 40. Thus it will be seen that a strong and durable main frame is provided for holding the various working parts of the machine.

Figure 4:
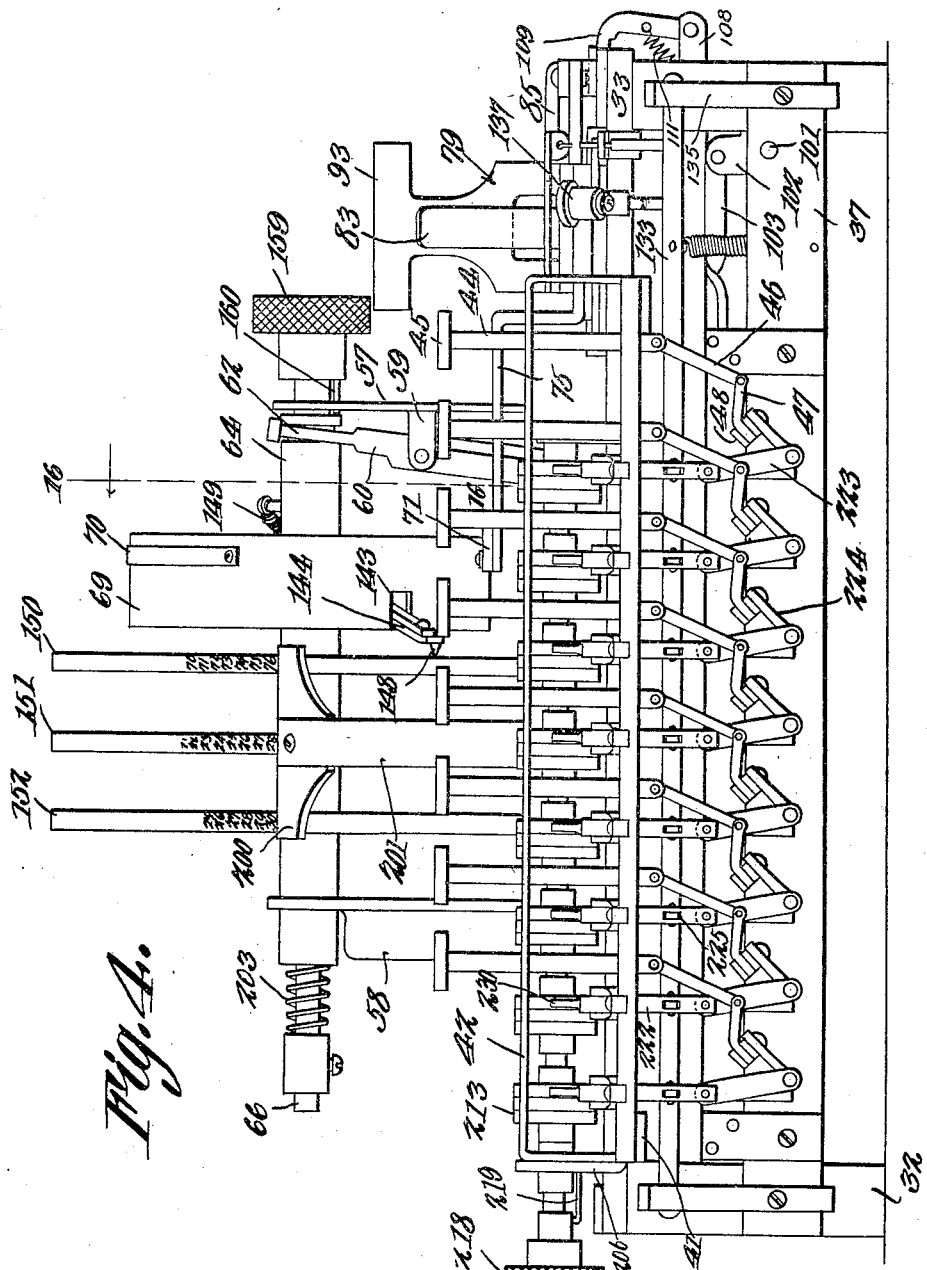
Fig. 4 is a front elevation of the machine with the housing removed.

Extending forwardly from the front bar 33 are brackets 41 and supported by these brackets are superposed guide strips 42 and 43 (see Figs. 4 and 25) in which are slidably mounted the non-rotatable stems 44 of tally keys 45. The lower end of each stem 44 is connected by a downwardly extending link 46 to an arm 47 extending laterally from the front end of a revoluble rod 48 which is preferably angular in cross section and has rounded portions journaled within the front and rear cross strips 37 and 38. One of these rods is of course provided for each key 45 and stem 44 and it is to be understood that one key is provided for each standard length of lumber.

Figure 2:
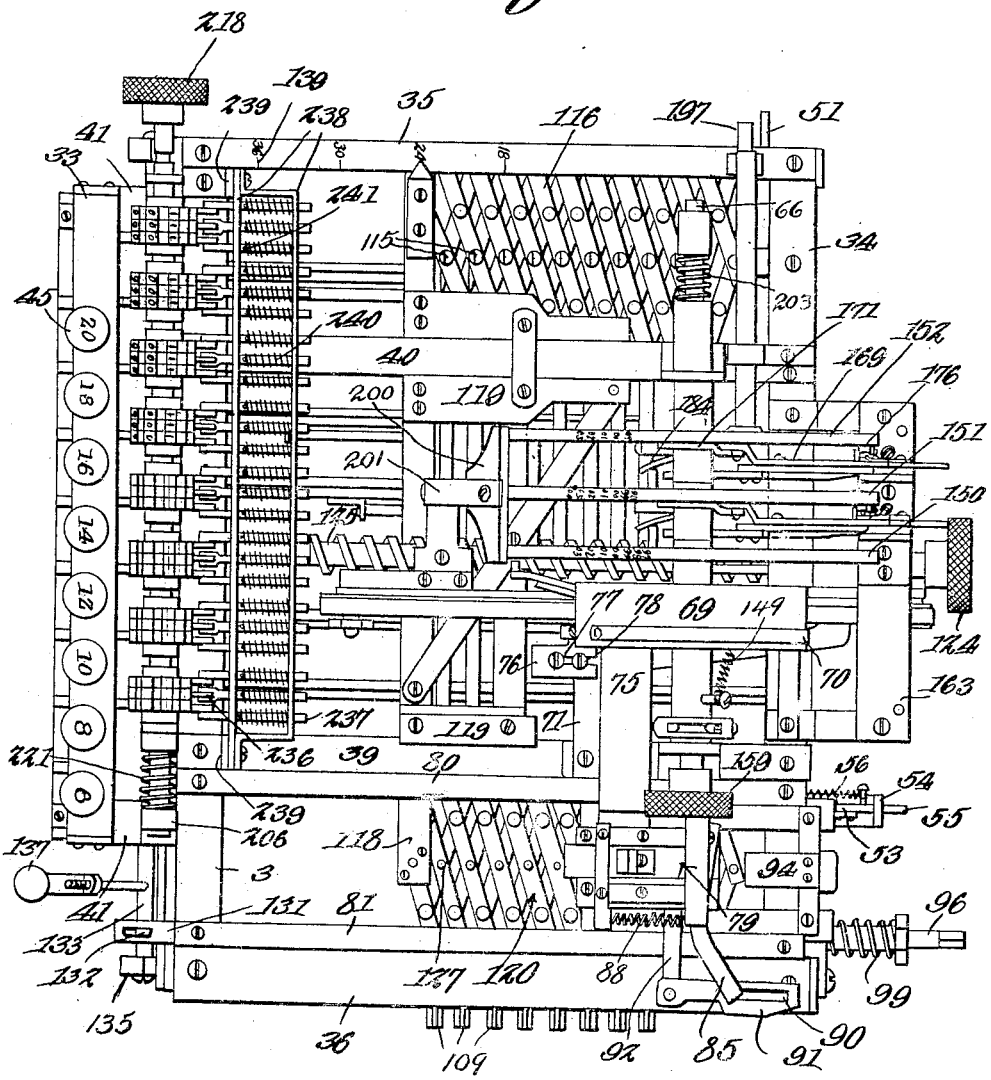
Fig. 2 is a plan view of the machine with the housing removed.
Figure 5:
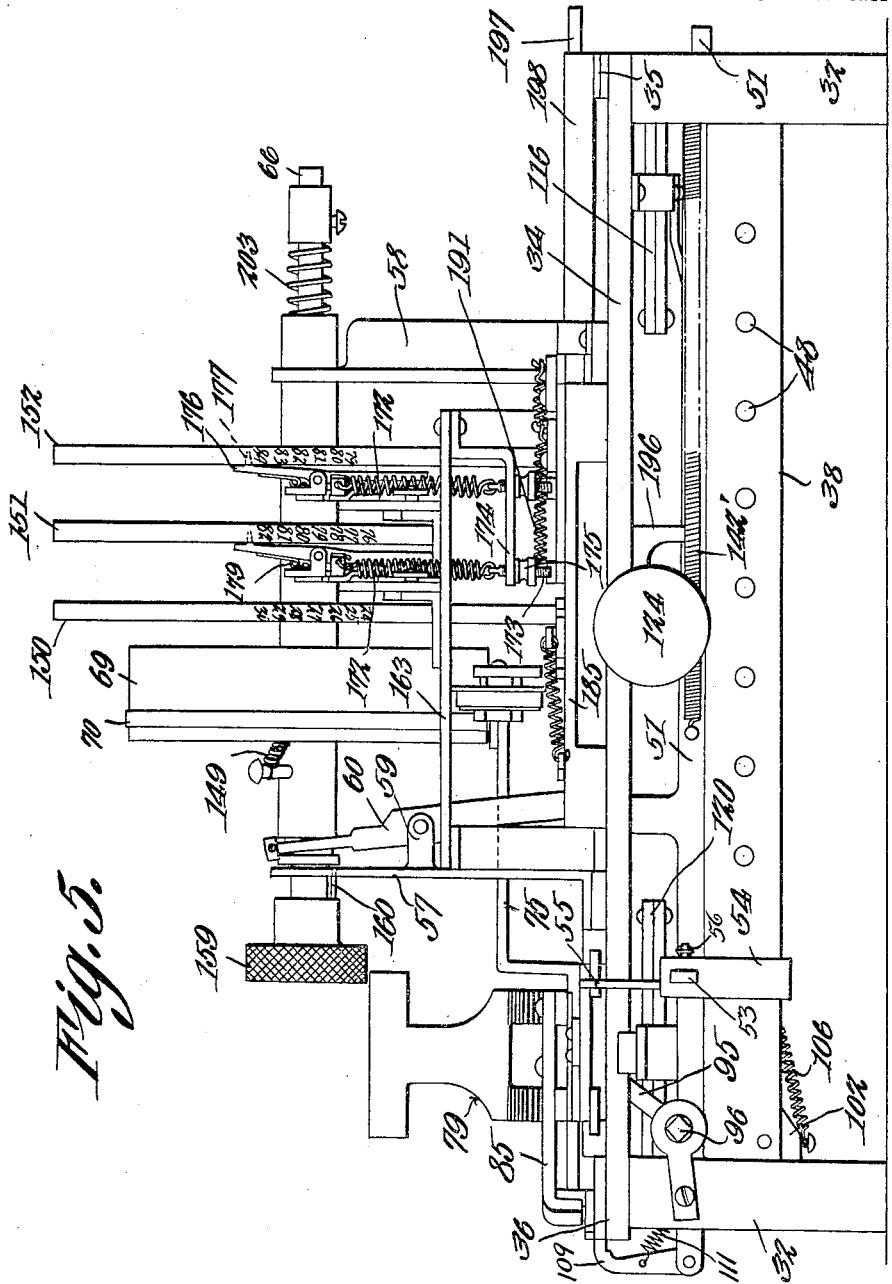
Fig. 5 is a rear elevation thereof.
Figure 6:
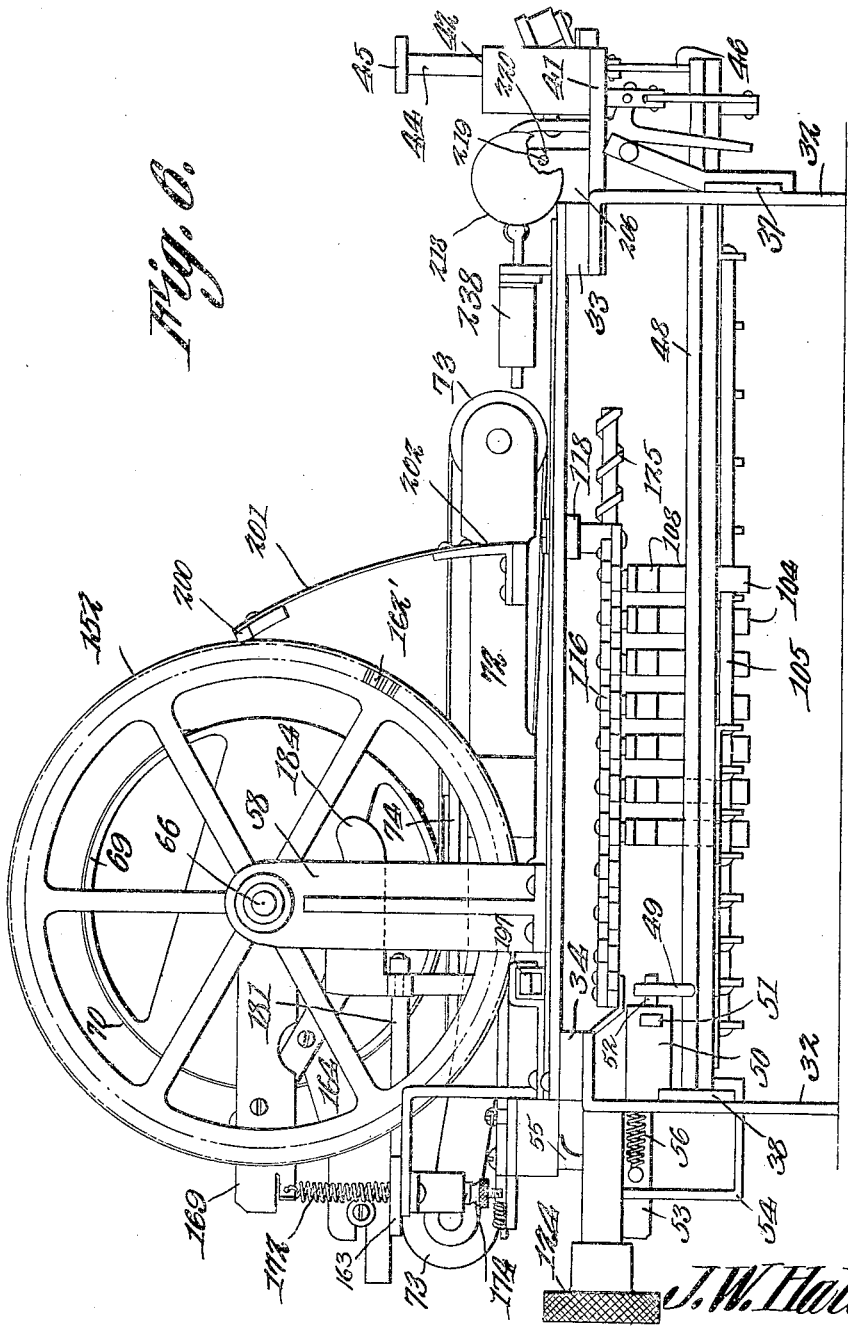
Fig. 6 is an elevation of one side of the mechanism, the housing being removed.

Extending upwardly from each rod 48 near the back end thereof is a finger 49 (see Figs. 3, 6 and 8) preferably slightly curved as shown in Fig. 8. All of the fingers 49 of the several rods 48 are disposed on a straight line extending transversely of the machine (see Fig. 3) and slidably mounted in a bracket 50 extending forwardly from one side of the back strip 38 is a coupling bar 51 (see Figs. 3, 6 and 8) which is supported close to the fingers 49 and has pins 52 extending therefrom and adapted to be engaged by the respective fingers 49. That end portion of the coupling bar 51 remote from the supporting bracket 50 normally bears against a latch 53 (see Figs. 2, 3, 5, 6, 8 and 11) which is slidably mounted in a bracket 54 provided therefor and which bracket is fixedly connected to the back cross strip 38. An arm 55 is extended upwardly from the latch 53 and a spring 56 (see Figs. 2, 5 and 6) is attached at one end to the latch 53 and at its other end to the front portion of the bracket 54, thus to hold the latch 53 normally projected across the end of the coupling bar 51 (see Fig. 3), thereby to hold said coupling bar against longitudinal movement. When the latch is in this position the arm 55 is held forward close to and slightly above the rear cross bar 34.

Upstanding from the guide strip 39 is a standard 57 and another standard 58 is fixedly mounted on the guide strip 40. Ears 59 are extended inwardly from the standard 57 and pivotally connected to them is a lever 60 the lower end of which is pivotally connected, as at 61 to the coupling bar 51, while the upper end of the lever is forked as at 62 and is seated within an annular groove 63 formed in one end portion of a sleeve 64. This sleeve, in turn, is loosely mounted on an elongated tubular member 65 mounted on a shaft 66. One end of the shaft 66 is journaled in the standard 58 and said standard engages one end of the tubular member 65. The other end of the tubular member 65, as well as the shaft 66, extends through the standard 58. Thus it will be seen that when the coupling bar 51 is shifted to the right by the swinging action of any one of the fingers 49 due to the rotation of its bar 48, the lever 60 will be swung about its fulcrum 67 and will cause the fork 62 to shift sleeve 64 and tubular member 65 longitudinally. Under ordinary conditions, however, the coupling bar 51 cannot be shifted for the reason that it is held against movement by the latch 53 as hereinbefore pointed out.

Mounted for rotation on the tubular member 65 is the hub portion 68 of a drum 69. A band 70, preferably of steel, is wrapped about the drum and fastened thereto and the ends of this band are extended forwardly and rearwardly from the lowermost portion of the drum. The guide strip 39 has an arm 71 fixedly attached thereto and extending inwardly toward the center of the machine and secured to the inner end of this arm 71 and extending longitudinally of the machine is a supporting strip 72 on the ends of which are mounted sheaves 73. One end of the band 70 extends over the rear sheave 73 and thence forwardly under the arm 71 to the front sheave 73 over which it passes and is attached to the rear end of an arm 74 secured to and extending rearwardly from a laterally projecting bracket 75. The other end of the band 70 is attached to a block 76 which is formed with a longitudinal slot 77 and is held by binding screws 78 to the front portion of arm 74. Obviously by loosening the screws 78, block 76 can be adjusted longitudinally thus to take up slack in the band 70.

The bracket 75 is fixedly connected to and extends inwardly from a carriage 79 (see Figs. 10, 13 and 14) which is slidably mounted in guide rails 80 and 81 secured to the guide 39 and the side bar 36 respectively. The carriage 79 has a central guide member 82 from which projects an upwardly extending finger piece 83. A slide 84 is mounted on the guide member 82 and pivotally connected to the rear end of the slide is a lever 85, the pivot of said lever being indicated at 86. One end of the lever is pivotally connected as at 87 to one side portion of the slide 84. The other end portion of the lever is extended laterally and rearwardly from the slide and carriage and is connected by a spring 88 to the front portion of the slide, thus to hold the slide normally pressed rearwardly with its front end against the finger piece 82 and also holding the outer end of the lever 85 normally drawn forwardly. The outer end of the lever 83 is downturned as at 89 in Fig. 15 and works within a longitudinal slot 90 formed within a releasing shoe 91. This releasing shoe is pivotally connected at its forward end to an arm 92 extending laterally from the slide 84 and overhanging but lying close to the side bar 36. The shoe 91 is adapted to slide along the side bar 36.

Another finger piece 93 is supported by the carriage, this finger piece being carried by the slide 84 and being supported back of the finger piece 83. (See Figs. 10 and 13.) Thus when the finger piece 93 is drawn forwardly toward the fixed finger piece 83, the slide 84 will be drawn forwardly upon its guide member 82 with the result that the pivot 87 will be drawn forwardly and lever 85 will be caused to swing rearwardly at its outer end against the action of spring 88. As the depending end of lever 85 works within the slot 90, this movement will of course cause the shoe 91 to swing inwardly at its rear end about its pivotal connection with the arm 92.

A tongue 94 extends downwardly from the rear portion of the carriage 79 and is for the purpose hereinafter pointed out.

Rearward sliding movement of the carriage may be limited by a stop button shown in detail in Fig. 12. This button 95 is secured to the forward end of a short shaft 96 journaled within a tubular bearing 97 provided therefor and which bearing is supported by one of the legs 32. Shaft 96 is capable of a slight longitudinal movement within its bearing, and a collar 98 is secured to the shaft and engages one end of a coiled spring 99 mounted on the bearing member 97 and which spring constantly pulls the button 95 into engagement with the back bar 34. This back bar has a recess 100 in its front edge in which the button is designed to be seated when raised, the spring 99 serving to pull the button back into the recess as will be obvious by referring to Figs. 10 and 12. When the button is thus elevated it projects into the path of one side of the carriage 79, as shown in Figs. 10 and 12 and thus the rearward movement of the carriage is limited and the other side of the carriage is therefore prevented from coming against the upstanding arm 55 of latch 53. Consequently as long as the button 95 is held in raised position the coupling bar 51 is held against movement and it becomes impossible to actuate any of the keys 45 because the pins 52 will be held pressed against the upstanding fingers 49 on the revoluble bar 48. This button 95 thus constitutes a means for preventing the machine from being manipulated except by some duly authorized person, it being the intention to provide a special key for actuating the shaft 96 to shift the button 95 downwardly out of the recess 100 and out of the path of the carriage 79.

Connecting the front and back strips 37 and 38 close to one side of the machine and under the path of the carriage 79 is a pivot rod 101. Mounted on this pivot rod is a series of bell crank levers 102 equal in number to the keys 45. One arm of each bell crank lever is connected by a link 103 to an ear 104 which is slidably mounted on a rod 105 connected to and extending longitudinally of one of the angular rods 48. Thus when the rod 48 is rotated the rod 105 will act as a crank and pull through the ear 104 upon link 103 and cause the bell crank lever 102 to work upon its pivot rod 101. A spring 106 connects link 103 with the angle portion of the bell crank lever 102 (see Fig. 19), this spring thus serving to hold the upper arm of the bell crank lever normally pressed outwardly and the rods 48 so positioned as to hold the keys 45 normally elevated.

The lower arm of the bell crank lever 102 is connected by a link 107 to one end of a lifting bar 108, there being a locking dog 109 pivotally attached to the adjacent end of the lifting bar and extending upwardly therefrom. This locking dog has a head 110 designed, when the dog is raised, to move over and into engagement with the outer edge portion of the side bar 36. A spring 111 connects the dog to the lifting bar 108 so as to shift it automatically into engagement with the bar 36 when the dog is raised out of normal position. In Fig. 19 the several parts herein described have been shown and the dog 109 has been illustrated raised into engagement with the side bar 36. It is to be understood that one of these bars 108 is provided for each key 45, and that each bar has a dog 109 extending therefrom. Furthermore each bar has a guide finger 112 depending therefrom and working within a longitudinal slot 113 in the link 103, thus to hold the link against lateral displacement relative to its lifting bar.

Figure 3:
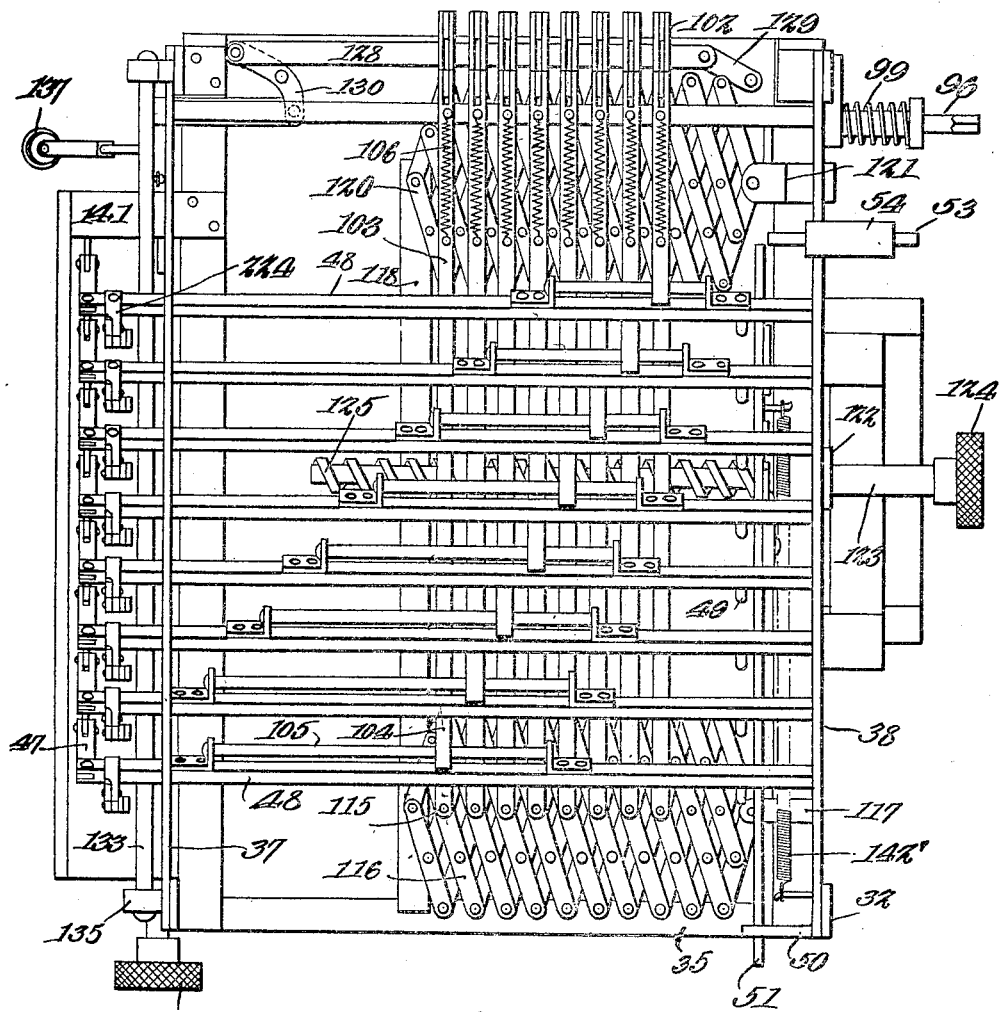
Fig. 3 is a bottom plan view of the machine, the housing being removed.

The several lifting bars 108 are extended transversely of the machine and are adjustably connected at those ends remote from the dogs 109 to brackets 114 which are attached to the central pivots 115 of a double lazy tongs 116 (see Figs. 3, 17 and 18). One end of this double lazy tongs 116 is pivotally attached to a bracket 117 extending forwardly from the back bar 34 of the frame. The other or forward end of said double lazy tongs is pivotally attached to a cross bar 118 extending under the guide strips 39 and 40 (see Fig. 2) and forming part of a frame 119 which slidably engages said guide strips. This frame may be of any construction desired and is to be so shaped and proportioned as to coöperate with the guides 39 and 40 to hold the bar 118 at all times straight across the machine and at right angles to the side bars 35 and 36. That end of the bar 118 remote from the double lazy tongs 116 is pivotally connected to the front end of another double lazy tongs 120 which constitutes a part of the stop mechanism. The other end of this double lazy tongs 120 is pivotally attached to a bracket 121 extending from the back bar 34.

Mounted for rotation within a bracket 122 depending from the back bar 34 is a stem 123 provided at its rear end with a knob 124. That portion of the stem projecting forwardly from the bar 38 is formed with an adjusting thread 125 which works within a block 126 depending from the slidable frame 119. Thus it will be seen that by rotating the knob 124 the thread 125 will shift the sliding frame 119 forwardly or rearwardly as desired, thus to set up a corresponding movement of the cross bar 118 and cause the two lazy tongs 116 and 120 to elongate or retract in unison and to the same degree. Instead of providing rivets as the center pivots of the double lazy tongs 120, slidable stop pins 127 are employed, each of these pins being secured at its lower end in one of the lifting bars 108. Thus it will be seen that the lifting bars, which are parallel, will be shifted toward or from each other by the lazy tongs when said lazy tongs are contracted or extended. During this shifting of the bars relative to each other the bell crank levers 102 will be free to slide along the pivot rod 101 and the ears 104 will be free to slide along the crank rods 105. As will be apparent from the foregoing description, the lifting bars 108 are normally held in lowered positions by the springs 106 pulling on the bell crank levers 102, the dogs 109 being normally disengaged from the side bar 36. Consequently the pins 127 are normally in lowered positions with their upper ends out of the path of the tongue 94.

For the purpose of releasing the locking dogs 109 from engagement with the side bar 36 when, for example, the wrong key 45 has been depressed and locked by its dog 109, a special or supplemental mechanism is provided. This supplemental means includes a push bar 128 which is supported close to and under the side bar 36 by a link 129 and a lever 130. The inner end of lever 130 is connected by a link 131 to a finger 132 upstanding from a rock shaft 133, there being a slot 134 in link 131 through which the finger 132 extends. Rock shaft 133 is journaled in forwardly extending brackets 135 carried by the front legs 32 and extending forwardly from this rock shaft is an actuating lever 136 carrying a depressible key 137. Releasing fingers 138 also extend from the rock shaft 133 and are disposed close to the respective stems 44. These fingers are for the purpose hereinafter pointed out.

The side bar 36 is provided with graduations indicated at 139 and these graduations are provided with numerals designating different total widths of lumber contained in bundles. For example, one graduation may be designated by the numeral 24 indicating that all of the pieces of lumber in one bundle total a width of twenty-four inches. Another graduation may be indicated by the numeral 30 to designate that the total width of all of the pieces in a bundle is equal to thirty inches, etc. Bar 118 has a pointer or index 140 extending therefrom and which is designed to work over the side bar 35 and to register with any one of the graduations thereon.

For the purpose of holding the key 137 normally elevated and the push bar 128 normally pressed against the locking dogs 109 a finger 141 is preferably extended from the rock shaft 133 and has a spring 142 connected thereto. A spring 142' is likewise provided (see Figs. 3 and 5) for holding the coupling bar 51 yieldingly at one limit of its movement, one end of this spring being attached to the bar 51 while the other end thereof is attached to the leg 32 under the rear portion of the side bar 35.

As heretofore stated the drum 96 is mounted to rotate freely on the tubular member 65 (see Fig. 22). Formed in the peripheral portion of this drum is an opening 143 and extending through the opening is a lever 144 the inner end of which is pivotally connected to an ear 145 formed in the drum. A bracket 146 is secured to the sleeve 64 and is connected to lever 144 by a link 147 (see Fig. 9). Extending from the outer end of lever 144 is a tooth 148. A coiled spring 149 (see Figs. 4, 5 and 9) connects the sleeve 64 to the drum 96 and is held constantly taut by the heavier and stronger spring 142 which pulls on the coupling bar 51. By having the two springs pulling in opposition, however, a stiff connection between the parts is provided.

Mounted to rotate freely on the tubular member 65 is a series of adding wheels, preferably three, and which wheels have been indicated at 150, 151 and 152. The wheels are held properly spaced from each other by spacing sleeves 153 which are secured to the tubular member 65 by set screws 154 or the like. Registering slots 155 and 156 are formed in the sleeves 153 and tubular member 65 so as to accommodate resetting pins 157 which radiate from the shaft 66 at points between the wheels and are adapted to slide with said shaft when it is shifted longitudinally within the tubular member 65 as hereinafter pointed out. Laterally extending resetting pins 158 are extended from the wheels 150 and 151 and are adapted to be engaged by the pins 157 when shaft 66 is shifted longitudinally to the right in Fig. 20 by pulling on a knob 159 located on the shaft. This knob has a locking pin 160 extending from its inner end and adapted to be seated in an opening 161 in standard 57 after the wheels have been set at zero as hereinafter pointed out. On the periphery of each wheel is provided a series of numerals preferably ranging from zero to ninety nine. Formed within wheel 150 are transverse apertures 162' corresponding with the numerals on the periphery of the wheel and any one of these apertures is adapted to receive the tooth 148 carried by lever 144. Under normal conditions, however, the tooth is out of engagement with the wheel 150.

Extending laterally from the wheel 150 is a tripping pin 162 and this pin is adapted, upon the completion of one rotation of the wheel 150, to operate novel mechanism whereby the adjoining wheel 151 will be actuated. The same kind of mechanism is controlled by wheel 151 for moving wheel 152 one notch or graduation upon the completion of one rotation of wheel 151. As the same kind of mechanism is operated by each of the wheels 150 and 151 a description of one set of mechanism is all that is deemed necessary. This power transmitting mechanism has been shown in perspective in Fig. 22 and certain portions thereof have been illustrated in other figures of the drawings.

Supported upon the back bar 38 is a bracket 163 which extends across the back portions of the wheels 150, 151 and 152. To this bracket is attached a forwardly extending arm 164 on the front end portion of which is pivotally mounted, as at 165, a lever 166 having a longitudinal slot 167. Extending into this slot is a laterally projecting stud 168 extending from a lever 169 which is pivotally mounted on the tubular member 65 in any suitable manner. For example, the end of the lever can be forked as shown at 170 and said forked end can be held astride the tubular member 65 by a locking dog 171 pivotally connected to the lever as shown in Fig. 22. A spring 172 is connected to the rear end of lever 169 and extends downwardly through the bracket 163 and is fastened to an adjusting screw 173 extending through an arm 174 secured to and extending under the bracket 163. By means of a nut 175 engaging the screw 173 the tension of the spring 172 can be regulated. In this connection see Fig. 5.

Pivotally connected to one side of the rear end portion of lever 169 is a pawl 176. This pawl is adapted to swing in a plane extending at right angles from the lever 169 and is provided with a laterally extending tooth 177 designed to enter any one of a series of openings 178 formed in the wheel 151 close to the periphery thereof. A light spring 179 is interposed between lever 169 and pawl 176 and serves to hold the tooth 177 normally pressed toward the adjacent wheel 151.

Extending forwardly from the pivot end of lever 166 is a curved finger 180 which projects into the path of the pin 162.

Secured to and extending forwardly from the bracket 163 is a bearing arm 181 and mounted to swing laterally upon the forward end portion of this arm is a lever 182 from the upper arm of which is extended a wing 183. This wing is extended forwardly from the lever and has its forward end inclined laterally as shown at 184 so that, after the pin 162 has passed off of the finger 180 as hereinafter described, the end of the pin will press against the laterally extended end portion 184 of wing 183 and shift said wing laterally about its bearing 181. Consequently the lower arm of lever 182 will be swung laterally.

Secured to the back portion of the frame of the machine and under the bracket 163 is a supporting strip 185 and pivotally connected to this strip and extending forwardly therefrom is a restraining lever 186 having an opening 187 through which the lower arm of lever 182 extends loosely. A block 188 is slidably mounted on this lever and has a tooth 189 adapted to be seated within any one of the openings 178 in wheel 151. This block is held yieldingly against sliding movement in one direction by a spring 190 mounted on the free end portion of the lever 186. Another spring 191 connects the lever 186 to its supporting strip 185 and serves to hold the tooth 189 normally pressed in engagement with the wheel 151.

Another restraining lever 192 (see Figs. 20 and 22) is pivotally mounted on the strip 185 (see Fig. 5) and has a tooth 193 adapted normally to project into one of the apertures 162 in the wheel 150. A spring 194 connects one arm of lever 192 to the strip 185 and thus serves to hold the tooth 193 normally in engagement with wheel 150. Lever 192 has an arm 195 which extends downwardly and forwardly under the wheel 150 and into the path of a finger 196 extending upwardly from the coupling bar 51.

As has heretofore been stated, mechanism such as illustrated in Fig. 22 is not only interposed between the wheels 150 and 151 but similar mechanism is also interposed between the wheels 151 and 152. As the wheel 150 is normally held against rotation by the tooth 193 and as the wheels 151 and 152 are normally held against rotation by the teeth 189 it is desirable to have some means for simultaneously shifting these teeth out of engagement with the wheels so that the wheels can be reset by the knob 159. For this purpose a releasing bar 197 is slidably mounted in a guide 198 provided therefor, one end of this bar being adapted to press against the depending arm 195 of lever 192 while arranged on the bar at proper intervals are upstanding ears 199 adapted to press against the respective levers 186, thus to press said levers laterally and disengage teeth 189 from the wheels when the bar 197 is shifted longitudinally. The various springs 191 and 194 will of course operate to hold the bar 197 normally in projected position.

For the purpose of holding the wheels against free rotation while being actuated in the manner hereinafter pointed out, a brake shoe 200 is extended across the peripheries of the wheels and is held in frictional engagement therewith by a spring arm 201 which supports the shoe and is attached to a bracket 202 mounted on some part of the frame of the machine, as for example the sheave carrying strip 72.

The operation of that portion of the machine thus far described is as follows:—

By means of a suitable key the shaft 96 is rotated so as to shift the button 95 downwardly out of recess 100 and out of the path of the carriage 79. The carriage is then shifted rearwardly so as to come against the arm 55 of latch 53, thereby withdrawing the latch from the path of the coupling bar 51. If the first bundle of lumber handled contains six pieces each four inches wide, it will be apparent immediately to the tally man that said bundle contains a total width of twenty four inches. Thus the knob 124 is rotated to cause the screw 125 to extend or contract the lazy tongs until the pointer or index has been brought to position over the graduation 139 indicating 24 inches. This adjustment of the lazy tongs will result in relative movement of the lifting bars 108 as hereinbefore described so that they will be maintained at all times in proper relation to the parts with which they coöperate. After the adjustment of the lazy tongs has been effected as described, the operator depresses the key 45 on which is indicated the length of the bundle being registered. As before stated the bundles come in standard lengths and one key 45 is provided for each length, each key having characters thereon to designate one of these standard lengths. For example if the bundle is twelve feet long, the operator depresses that key 45 on which the numeral 12 appears. When this key is depressed it rotates the rod 48 to which it is coupled and this rotation results in several distinct operations. The rod 105 connected to the actuated rod 48 will of course be swung downwardly under rod 48 and will pull on bar 103 so as to thrust upwardly through link 107 against the lifting bar 108 (see Fig. 19). Consequently the dog 109 coupled to said lifting bar will be elevated into engagement with the side bar 38 so that the lifting bar will thus be locked in raised position and the key 45 will be locked in lowered position. The elevation of the lifting bar 108 will result in the elevation of the stop pin 127 which is connected to said bar. Thus this stop pin will be lifted into the path of the depending tongue 94 on the slidable carriage 79.

The actuation of rod 48 by the depression of the key 45 will likewise result in the transmission of motion through finger 49 of said rod to the finger 52 and the coupling bar 51. As this coupling bar is free to move in view of the fact that the latch 53 has been pushed back by the carriage 79, the actuation of the bar will result in the shifting of lever 192 so that the tooth 193 will be withdrawn from engagement with the wheel 150. If by any chance the operator has depressed the wrong key, the parts can be promptly returned to their normal positions by depressing the supplemental key 137 which will cause the lever 130 to push bar 128 against the elevated locking dog 109 and shift said dog out of engagement with the side bar 36 so that the springs will return the various parts to their initial positions.

After the key 45 has been depressed as hereinbefore pointed out and locked in such position, the operator grasps the two finger pieces 83 and 93 and pulls them toward each other, at the same time pulling the carriage 79 forwardly. When the finger piece 93 is drawn toward the finger piece 83 the lever 85 is actuated to draw the shoe 91 inwardly so that it will not contact with the elevated dog 109 during the forward sliding movement of the carriage. The forward movement of the carriage will continue until the tongue 94 comes against the elevated stop pin 127 whereupon further forward movement of the carriage will be prevented. During this forward movement the band 70 is actuated and rotates the drum 69. As the lever 144 has been shifted by lever 60 and coupling bar 51 so as to move the tooth 148 into the opening 162 registering therewith it will be obvious that the rotation of the drum by the band will result in the corresponding rotation of the wheel 150. The parts are so proportioned that this rotation of the wheel will bring to view a graduation which will indicate accurately the number of lumber feet in the bundle. In other words, if the total width of the lumber in the bundle is twenty-four inches and the bundle is twelve feet long, the wheel will show the numeral 24 indicating that there are twenty-four lumber feet in the bundle. If another bundle of the same size is next counted the same operation is gone through with and the wheel will be moved forwardly another distance as described so that there will appear a graduation designated by the numeral 48 indicating that the total number of lumber feet in the two bundles is forty eight. Should the lumber width of the next bundle differ from that of the preceding bundles, the operator promptly readjusts the lazy tongs so that the index or pointer 140 will move to the graduation indicating the new lumber width, after which a key designating the length of the bundle is depressed and the operation carried out as before. It might be stated that as soon as the carriage has been drawn forward against its stop during each operation, the finger pieces 83 and 93 are released and the shoe 91 promptly shifts laterally to disengage the elevated dog 109 from the side bar 36. Thus the key 45 which has been depressed will return to its normal or raised position.

As the first or "unit" wheel 150 completes one rotation, its pin 162 gradually depresses the finger 180 so as to cause lever 166 to raise lever 169 against the action of spring 172 and shift the pawl 176 upwardly one notch on the wheel 151. The pin then passes off of the end of finger 180 but as the wheel 151 is held against rotation by the tooth 189, spring 172 will not return lever 169 and pawl 176 to their normal positions, but, instead, such parts will be held in their elevated positions. Just as the highest graduation on the unit wheel 150 passes out of view and the initial or zero graduation comes into view, the pin 162 comes against and pushes laterally the end portion 184 of wing 183. Consequently lever 186 is shifted laterally and withdraws the tooth 189 from engagement with the wheel 151. Thus spring 172 is released and pulls pawl 176 back to its normal or lower position thereby rotating the "tens" wheel 151 one point. After the wheel 151 has completed one revolution, motion is transmitted in a similar manner to the next wheel 152. When it is desired to reset the wheels, the bar 197 is shifted longitudinally and pushes all of the teeth 189 and 193 out of engagement with their respective wheels, after which shaft 66 is rotated by knob 159 and pins 157 and 158 caused to engage each other by pulling knob 159 against the action of a spring 203 which is mounted on one end portion of the shaft 66 as shown in Fig. 20. It might be stated that when the shaft 66 is drawn longitudinally in this manner the pin 160 is withdrawn from the opening 161 and during the rotation of the knob 159 and shaft 66 for the purpose of resetting the wheels, this pin 160 will slide upon the outer side of the standard 57 until the shaft has completed one rotation whereupon the pin 160 will come into register with the opening 161 and enter the same under the action of spring 203. Thus the parts will be reset and the foregoing operation can be repeated.

In order that the number of bundles of each length can be registered, each key 45 controls tally mechanism of novel form. In other words, the number of depressions of each key is registered so that on completion of the tallying operation, the operator will have a record not only of the total number of lumber feet counted, but also of the total number of bundles of each length.

The tally mechanism includes a shaft 204 mounted to slide and rotate within a sleeve 205 which is mounted for rotation in brackets 206 carried by the front portion of the frame. Shaft 204 has a longitudinal groove 207 and formed in the bottom of this groove at regular intervals are groups of recesses 208 equal in number to the number of tally wheels in each group. In each of these recesses is slidably mounted a setting pin 209 having a V-shaped head 210 which is normally seated in the groove 207 and held against rotation by the walls of the groove. A spring 211 is arranged between the inner end of each pin and the end wall of the recess 208 and serves to hold the head of the pin normally pressed outwardly against the inner surface of the sleeve 205. As in the present instance, where there are three tally wheels in each group, three setting pins 209 are provided in each group. One of these groups has been shown in Fig. 27.

Secured to the sleeve 205 in any desired manner are spacing collars 212 arranged in pairs and mounted for rotation on the sleeve between the collars of each pair are tally wheels 213, 214 and 215, for indicating "units" "tens" and "hundreds" respectively. That portion of the sleeve 205 between the collars 212 of each pair has tapered openings 216, one of these openings being closed by each of the tally wheels. Furthermore, formed in the central opening in each of the tally wheels is a notch 217 and once during each rotation of each of the tally wheels, this notch is brought into register with the opening 216 closed by the wheel. Obviously under normal conditions the tally wheel can rotate freely on the sleeve 205. However, by shifting shaft 204 longitudinally the heads 210 of the setting pins 209 will be brought into register with the openings 216 and will spring outwardly thereinto so that by making one complete rotation of shaft 204 the heads 210 will be brought successively into the notches 217 in all of the wheels thus coupling said wheels to the sleeve 205 and causing them to rotate therewith. A knob 218 is provided at one end of the shaft 204 and by means thereof the shaft can be moved longitudinally and rotated. A pin 219 is connected to the knob and extends inwardly therefrom and works in the same manner as does the pin 160 on knob 159. In other words, when the pin 219 is seated in an opening 220 in the adjacent bracket 206 the shaft will be held against rotation. By pulling on knob 218 to withdraw pin 219 from opening 220 the setting pins 209 are brought into register with the openings 216 and by then rotating the shaft 204 by means of knob 218, the locking pin 219 will slide upon the outer face of the bracket 206 as the setting pins successively take up the tally wheel 213 and, upon the completion of one rotation of the shaft, pin 219 will be brought into register with opening 220 whereupon all of the tally wheels will display their first character (0). A spring 221 (see Fig. 2) is mounted on the shaft and serves to shift the pin 219 into the opening 220 when they are brought into register.

Slidably mounted in the guide strip 43 are slide bars 222 and connected to the lower end of each of these slide bars is a link 223 which, in turn, is connected to a finger 224 extending from the adjacent rod 48. Thus each time one of the stems 44 is depressed so as to rotate its rod 48, motion will be transmitted from said rod through the finger 224 and the link 223 to the slide bar 222 connected thereto.

Each bar 222 has a slot 225 and loosely pivoted in each of these slots is an ear 226 extending forwardly from a pawl 227. This pawl is not only free to swing about its pivot 228 but is also free to swing laterally on said pivot because of its loose mounting thereon. A spring 229 is secured to the sliding bar 222 and bears against the upper end of the pawl so as to hold the head 230 of said pawl normally seated in any one of a series of notches 231 formed in the periphery of the "unit" tally wheel 213. Ten notches 231 are formed in the periphery of the tally wheel 213 and these notches are all of the same width and all but one of them are of the same depth. The spaces between the notches have characters displayed thereon ranging from zero to 9. The notch between the characters 7 and 8 has its inner wall inclined inwardly and laterally toward the second or intermediate tally wheel 214, as shown at 232 in Figs. 27, 29 and 31.

The intermediate or "tens" tally wheel 214 has ten peripheral notches all of uniform width and depth and the spaces between these notches are also designated by characters ranging from 0 to 9. In the space between the 7 and 8 characters is mounted a leaf spring 233 designed to work freely in a recess 234 as shown in Fig. 31, this leaf spring carrying a head 235 which is normally housed within said notch.

The third or "hundreds" tally wheel 215 has ten peripheral notches of uniform width and depth. The spaces between these notches are designated by characters ranging from 0 to 9. Under normal conditions the 0 characters on all of the tally wheels are in line and when they are thus positioned the notches 217 in all of the tally wheels are in register with the openings 216. All of the wheels are thus coupled to the shaft 204 as long as the setting pins 209 have their heads 210 in the openings 216 and 217. However, by bringing the pin 219 into the opening 220 and permitting shaft 204 to shift under the action of its spring 221 (see Fig. 2) the setting pins will withdraw from the opening 216 and thus permit independent rotation of the tally wheels.

It is to be understood that each time one of the stems 44 is pushed downwardly the pawl 227 will move therewith and on the first operation of the pawl its head 230 will become seated in the notch 231 in the wheel 213 thus pulling the wheel out of its initial position so that instead of the character "0" being visible the character "1" will be brought into position. When the pawl is again depressed the character "2" will be brought into view. After the character "9" has been brought to view, the next downward movement of the head 230 will result in said head coming against the inclined inner wall 232. Consequently the head will be deflected laterally so as to project part way into that notch in wheel 214 which is between the characters "0" and "1". Thus during the tenth actuation of the wheel 213 the wheel 214 will be moved one notch. This lateral deflection of the pawl 227 is permitted by reason of the loose mounting of the pawl on the pin 228. After the wheel 210 has completed one rotation the head 235 will be brought to such position that when the pawl is deflected laterally upon the completion of a rotation of wheel 213, it will press against the head 235 as shown in Fig. 31 and push it into that notch in wheel 215 which is located between the characters "0" and "1". Consequently during this next movement of the two wheels 213 and 214, the wheel 215 will be moved one notch. When the pawl returns to its normal or raised position the head 235 will also return to its raised position and will not be actuated until wheel 214 has again been given one complete rotation.

It will of course be understood that as before pointed out, each stem 44 when depressed is locked by its dog 109. Consequently each pawl 222 when raised into engagement with its tally wheel will be locked in elevated position until the depressed key 45 is unlocked in either of the ways hereinbefore pointed out, whereupon the pawl will move downwardly during the upward or return movement of its stem 44 and cause the tally wheel to rotate. For the purpose of disengaging the elevated pawl from its tally wheel in the event of a mistake being made in depressing the wrong key, the fingers 138 have been provided so that when shaft 133 is rotated by means of the supplemental key 137, the push bar 128 will not only be actuated to disengage the dog 109 from the side bar 36, but one of the fingers 138 will also press against the elevated pawl 227 and shift it forwardly out of engagement with its tally wheel.

For the purpose of holding the tally wheels against rotation except when being subjected to the action of the pawls 222, a holding means is provided for each of the tally wheels. This holding means includes a small wheel 236 journaled upon one end of a rod 237 which is slidably mounted within guide strips 238 supported by brackets 239 mounted on the end portions of the front bar 33. Each of these slidable rods 237 is preferably angular in cross section so as not to rotate and a coiled spring 240 is preferably mounted on each rod and bears against a stop pin 241 thereon so as to hold the rod normally pressed forward with its retarding wheel 236 bearing against the tally wheel in the path thereof.

By providing these retarding wheels the tally wheels will not rotate backwardly while the pawls are being pushed upwardly on the peripheries thereof to their raised or engaging positions.

In order that the mechanism may be protected from dust and dirt and from improper handling, a housing 242 is preferably arranged thereover, this housing having a slot 243 within which the index or pointer 140 is free to work. Where the housing is employed, graduations are arranged on the housing instead of on the side bar 35. In the present construction these graduations have been shown both on the housing and on the side bar 35.

A slot 244 is provided in the top of the housing and the finger pieces 83 and 93 are adapted to work therein. The stems 44 project through suitable openings in the top of the housing and a slot 245 is provided in the front wall of the housing for the reception of the key lever 136. Shaft 204 is extended through one side of the housing so that knob 218 is thus exposed and an opening 246 is also provided for the reception of the slidable bar 51. The housing has a hood 247 which extends over the adding wheels and in this hood are provided openings 248 through which the characters on said wheels are visible as the wheels are rotated. The knob 159 which is used in resetting the adding wheels is positioned beyond one side of the hood 247. An extension 249 of the housing 242 is arranged over the tally wheels and has openings 250 through which certain of the characters on the tally wheels are visible. Obviously the adjusting knob 124 is also arranged outside of the housing at the back thereof.

What is claimed is:—

1. A machine for registering lumber including separate stops, separate length designating means, means operated by the length designating means for shifting a selected stop, adding mechanism, and means for moving the selected stop to vary the extent of operation of the adding mechanism in proportion to the difference in widths of lumber of a designated length.

2. The combination with separate stops, of separate length designating means, means operated by said designating means for shifting a selected stop, width indicating means, means for moving the selected stop and the width indicating means in unison, adding mechanism, and means limited by the stop for actuating said mechanism.

3. The combination with adding mechanism, of means for actuating the same, separate stops, adjustable width indicating means, means operated therewith for spreading or retracting the stops relative to each other, separate length designating means, and means operated thereby for projecting a selected stop into the path of the actuating means of the adding mechanism.

4. The combination with adding mechanism, of a shiftable structure, means operated thereby when moved in one direction for actuating said mechanism, stops, lumber width indicating means, means operated therewith for moving each stop equally relative to the next adjoining stops, said stops being moved simultaneously, and means for projecting a selected stop into the path of the shiftable structure.

5. The combination with adding mechanism, of a shiftable structure, means operated thereby when moved in one direction for actuating said mechanism, stops, lumber width indicating means, means operated therewith for moving each stop equally relative to the next adjoining stops, said stops being moved simultaneously, and separate length designating means, and means operated thereby for projecting a selected stop into the path of the shiftable structure.

6. The combination with adjustable means for indicating lumber widths, of separate stops movable with said means to vary the distances between the stops, selective means for shifting the respective stops out of normal positions, and adding mechanism limited in operation by the shifted stops.

7. The combination with means for indicating lumber widths, and separate stops, of means for simultaneously moving said width indicating means and the stops in unison, said stops being movable relative to each other during such movement to vary the distances between the stops, means for shifting the respective stops out of normal positions, and adding mechanism limited in operation by the shifted stops.

8. The combination with adjustable means for indicating lumber widths, of a series of spaced stops, means for simultaneously shifting the stops and the width indicating means, said stops being movable relative to each other to vary the distances therebetween, length designating keys, separate means operated by the keys for shifting the respective stops out of their normal positions, and adding mechanism limited in operation by any one of the shifted stops.

9. The combination with adjustable means for indicating lumber widths, of separate stops movable with said means to vary the distances between the stops, means for shifting the respective stops out of normal positions, means for automatically locking each stop when shifted out of normal position, and adding mechanism limited in operation by the shifted stops.

10. The combination with adjustable means for indicating lumber widths, of separate stops movable with said means to vary the distances between the stops, means for shifting the respective stops out of normal positions, means for automatically locking each stop when shifted out of normal position, adding mechanism, a shiftable structure limited by the shifted stop for actuating said mechanism, and means on said structure for releasing the stop when the structure is brought to the limit of its movement against the stop.

11. The combination with adjustable means for indicating lumber widths, of separate stops movable with said means to vary the distances between the stops, means for shifting the respective stops out of normal positions, adding mechanism, and a shiftable structure limited in its movement by the shifted stop, for actuating the adding mechanism.

12. The combination with adjustable means for indicating lumber widths, of separate stops movable with said means to vary the distances between the stops, means for shifting the respective stops out of normal positions, means for locking the respective stops in shifted positions, irrespective of the relative movement of the stops with the width indicating means, adding mechanism, and a structure limited in its movement by the shifted stop for actuating the adding mechanism.

13. The combination with adjustable means for indicating lumber widths, of separate stops movable with said means to vary the distances between the stops, means for shifting the respective stops out of normal positions, means for locking the respective stops in shifted positions, irrespective of the relative movement of the stops with the width indicating means, adding mechanism, a structure limited in its movement by the shifted stops for actuating the adding mechanism, and means carried by said structure for releasing the stops when the structure is brought to said limit of its movement.

14. The combination with adjustable means for indicating lumber widths, of separate stops movable with said means to vary the distances between the stops, separate means for shifting the respective stops out of normal positions, means for registering the movements of each of said stop shifting means, and adding mechanism limited in operation by the shifted stops.

15. The combination with adjustable means for indicating lumber widths, of separate stops movable with said means to vary the distances between the stops, separate means for shifting the respective stops out of normal positions, separate means for locking the respective stops in shifted positions, adding mechanism, means limited in movement by a shifted stop for actuating said mechanism, and means for releasing the shifted stop.

16. The combination with adjustable means for indicating lumber widths, of separate stops movable with said means to vary the distances between the stops, separate means for elevating the respective stops out of their normal positions, adding mechanism limited in operation by a stop when elevated.

17. The combination with adjustable means for indicating lumber widths, of separate stops movable with said means to vary the distances between the stops, separate means for elevating the respective stops out of their normal positions, separate means for locking the respective stops in elevated positions, and adding mechanism limited in operation by an elevated stop.

18. The combination with adjustable means for indicating lumber widths, of separate stops movable with said means to vary the distances between the stops, separate means for elevating the respective stops out of their normal positions, separate means for locking the respective stops in elevated positions, adding mechanism limited in operation by an elevated stop, and means for unlocking the stop on completion of the movement of the adding mechanism.

19. The combination with adjustable means for indicating lumber widths, of separate stops movable with said means to vary the distances between the stops, separate means for elevating the respective stops out of their normal positions, separate means for locking the respective stops in elevated positions, adding mechanism limited in operation by an elevated stop, and means for unlocking the stop on completion of the movement of the adding mechanism, said means including a laterally movable element, and hand controlled means for shifting said element against the locking means.

20. The combination with adjustable means for indicating lumber widths, of separate stops movable with said means to vary the distances between the stops, separate means for shifting the respective stops out of their normal positions, said means being adjustable relative to each other with the stops, keys for actuating the respective shifting means, a locking element carried by each shifting means, means coöperating with all of the locking elements to hold any one of the shifting means in position when actuated to elevate a stop, and adding mechanism limited in operation by an elevated stop.

21. The combination with adjustable means for indicating lumber widths, of separate stops movable with said means to vary the distances between the stops, separate means for shifting the respective stops out of their normal positions, said means being adjustable relative to each other with the stops, keys for actuating the respective shifting means, a locking element carried by each shifting means, means coöperating with all of the locking elements to hold any one of the shifting means in position when actuated to elevate a stop, adding mechanism limited in operation by an elevated stop, and an unlocking element for engaging and releasing any one of the locking elements from its active position.

22. The combination with adjustable means for indicating lumber widths, of separate stops movable with said means to vary the distances between the stops, separate means for elevating the respective stops out of normal positions and irrespective of the movement of the stops toward or from each other, a locking element carried by each of said means, holding means for engagement by any one of the locking elements to hold the shifting means when its stop is elevated, separate keys depressible to actuate the respective shifting means, said locking elements operating to hold their keys in depressed positions, and means for disengaging the locking elements to release the stops and keys, and adding mechanism limited in operation by an elevated stop.

23. The combination with adjustable means for indicating lumber widths, of separate stops movable with said means to vary the distances between the stops, separate means for elevating the respective stops out of normal positions and irrespective of the movement of the stops toward or from each other, a locking element carried by each of said means, holding means for engagement by any one of the locking elements to hold the shifting means when its stop is elevated, separate keys depressible to actuate the respective shifting means, said locking elements operating to hold their keys in depressed positions, means for disengaging the locking elements to release the stops and keys, adding mechanism limited in operation by an elevated stop, tally mechanism combined with each key, and means operated by the elevation of the released key for actuating its tally mechanism.

24. The combination with adjustable means for indicating lumber widths, a plurality of actuating keys, and a member shiftable by any one of said keys, of separate stops movable with said width indicating means to vary the distances between said stops, means actuated by the respective keys for elevating the respective stops, adding mechanism, a structure slidable in one direction for actuating said mechanism, said structure being limited in movement by an elevated stop, means for holding the key actuated member against movement, and means actuated by said slidable structure when shifted to the other limit of its movement for releasing the key actuated member to permit actuation of the keys.

25. The combination with adjustable means for indicating lumber widths, a plurality of actuating keys, and a member shiftable by any one of said keys, of separate stops movable with said width indicating means to vary the distances between said stops, means actuated by the respective keys for elevating the respective stops, adding mechanism, a structure slidable in one direction for actuating said mechanism, said structure being limited in movement by an elevated stop, means for holding the key actuated member against movement, means actuated by said slidable structure when shifted to the other limit of its movement for releasing the key actuated member to permit actuation of keys, and key controlled means for preventing release of the key actuated member by the slidable structure.

26. The combination with adjustable means for indicating lumber widths, and separate stops movable with said means to vary the distances between the stops, of a coupling member, a plurality of keys operatively connected to the coupling member, separate means actuated by the respective keys for elevating the respective stops out of normal positions, means normally engaging the coupling member to hold the keys against movement, adding mechanism, and a slidable structure movable in one direction to release the coupling member and permit actuation of the keys and, movable in the opposite direction against a shifted stop to actuate the adding mechanism.

27. The combination with adjustable means for indicating lumber widths, and separate stops movable with said means to vary the distances between the stops, of a coupling member, a plurality of keys operatively connected to the coupling member, separate means actuated by the respective keys for elevating the respective stops out of normal positions, means normally engaging the coupling member to hold the keys against movement, adding mechanism, a slidable structure movable in one direction to release the coupling member and permit actuation of the keys, means for limiting such movement of the slidable structure to prevent release of the coupling member, said slidable structure being movable in the opposite direction against an elevated stop to actuate the adding mechanism.

28. The combination with adjustable means for indicating lumber widths, and separate stops movable with said means to vary the distances between the stops, of a coupling member, a plurality of keys operatively connected to the coupling member, separate means actuated by the respective keys for elevating the respective stops out of normal positions, means normally engaging the coupling member to hold the keys against movement, adding mechanism, a slidable structure movable in one direction to release the coupling member and permit actuation of the keys and movable in the opposite direction against a shifted stop to actuate the adding mechanism, and means for automatically locking the coupling member when the keys are returned to their normal positions.

29. The combination with adjustable means for indicating lumber widths, and separate stops movable with said means to vary the distances between the stops, of a coupling member, a plurality of keys operatively connected to the coupling member, separate means actuated by the respective keys for elevating the respective stops out of normal positions, means normally engaging the coupling member to hold the keys against movement, adding mechanism, a slidable structure movable in one direction to release the coupling member and permit actuation of the keys and movable in the opposite direction against a shifted stop to actuate the adding mechanism, means for automatically locking the respective stops in their elevated positions, means for releasing each stop when the slidable structure is brought thereagainst, and means for automatically locking the coupling member to hold the stops and keys in their normal positions after such release.

30. The combination with adjustable means for indicating lumber widths, of separate stops movable with said means to vary the distances between the stops, separate means movable relative to each other with the stops for shifting the respective stops to active positions, locking elements connected to the respective shifting means, a holding element for engagement by said locking elements to support the stops in active positions, means for actuating the respective shifting means, adding mechanism, a slidable structure movable against a shifted stop to actuate said mechanism, and means carried by said structure for releasing the engaged locking element when the structure is brought against the shifted stop.

31. The combination with adjustable means for indicating lumber widths, of separate stops movable therewith to vary the distances between the stops, means for elevating the respective stops out of normal positions, keys for actuating said means, a locking dog carried by each of said means, an elongated member for engagement by any one of the dogs to support the shifting means and their stops in elevated positions, adding mechanism, a slidable structure movable against an elevated stop to actuate said mechanism, and means for engaging any one of the dogs when elevated to release it from its holding means.

32. The combination with adjustable means for indicating lumber widths, of separate stops movable therewith to vary the distances between the stops, means for elevating the respective stops out of normal positions, keys for actuating said means, a locking dog carried by each of said means, an elongated member for engagement by any one of the dogs to support the shifting means and their stops in elevated positions, adding mechanism, a slidable structure movable against an elevated stop to actuate said mechanism, and means carried by the slidable structure for shifting an elevated dog out of its engaging position when said structure is brought against an elevated stop.

33. The combination with adjustable means for indicating lumber widths, of separate stops movable with said means to vary the distances between the stops, separate means connected to the respective stops and movable relative to each other with the stops for elevating the respective stops, an elongated holding member, locking dogs connected to the respective elevating means for engaging said holding means when the stop is elevated, separate key actuated rods slidably engaged by and operatively connected to the respective elevating means, adding mechanism, and a movable structure limited by an elevated stop for actuating said mechanism.

34. The combination with adjustable means for indicating lumber widths, of separate stops movable with said means to vary the distances between the stops, separate means connected to the respective stops and movable relative to each other with the stops for elevating the respective stops, an elongated holding member, locking dogs connected to the respective elevating means for engaging said holding means when the stop is elevated, separate key actuated rods slidably engaged by and operatively connected to the respective elevating means, adding mechanism, a movable structure limited by an elevated stop for actuating said mechanism, and means carried by said structure and movable along the holding means for disengaging the elevated dog from the holding means when the structure reaches a limit of its movement.

35. The combination with adjustable means for indicating lumber widths, of separate stops movable with said means to vary the distances between the stops, separate means connected to the respective stops and movable relative to each other with the stops for elevating the respective stops, an elongated holding member, locking dogs connected to the respective elevating means for engaging said holding means when the stop is elevated, separate key actuated rods slidably engaged by and operatively connected to the respective elevating means, adding mechanism, a movable structure limited by an elevated stop for actuating said mechanism, a releasing member movably mounted adjacent the holding member, and means under the control of the operator for shifting said movable member against the dog in engagement with the holding member to release the dog and the parts locked thereby.

36. The combination with a main structure, a slidable structure, and means for shifting said slidable structure relative to the main structure, of parallel lazy tongs each connected at its ends to the respective structures, lumber width indicating means carried by one of the lazy tongs, a series of stops carried by the other lazy tongs, separate key operated means for elevating any one of the stops, and adding mechanism limited in operation by the elevated stop.

37. The combination with separate structures, and means for moving one of the structures relative to the other, of parallel lazy tongs each connected at its ends to the respective structures, lumber width indicating means carried by one of the lazy tongs, stop elements carried by the other lazy tongs and disposed in alinement longitudinally of the lazy tongs, stop elevating means movable with the lazy tongs and connected to the respective stops, key operated means for actuating the respective stop elevating means, adding mechanism, and means limited by an elevated stop for actuating the adding mechanism.

38. The combination with separate structures, means for moving one of them relative to the other, and parallel lazy tongs each connected at its ends to the respective structures, of lumber width indicating means carried by one of the lazy tongs, a series of stops carried by the other lazy tongs, stop elevating means connected to and movable with the lazy tongs and connected to the respective stops, key operated means slidably and operatively engaged by said elevating means, adding mechanism, and means limited by an elevated stop for actuating the adding mechanism.

39. The combination with separate structures, means for moving one of them relative to the other, and parallel lazy tongs each connected at its ends to the respective structures, of lumber width indicating means carried by one of the lazy tongs, a series of stops carried by the other lazy tongs, stop elevating means connected to and movable with the lazy tongs and connected to the respective stops, key operated means slidably and operatively engaged by said elevating means, means for locking the elevating means in raised position, adding mechanism, means limited by an elevated stop for actuating the adding mechanism, and means for releasing the elevated stop.

40. The combination with separate structures, means for moving one of them relative to the other, and parallel lazy tongs each connected at its ends to the respective structures, of lumber width indicating means carried by the other lazy tongs, stop elevating means connected to and movable with the lazy tongs and connected to the respective stops, key operated means slidably and operatively engaged by said elevating means, means for locking the elevating means in raised position, adding mechanism, means limited by an elevated stop for actuating the adding mechanism, means for releasing the elevated stop, and means for automatically returning the elevated stop and its elevating means to their normal positions.

41. The combination with separate structures, and means for shifting one of the structures, of parallel lazy tongs each connected at its ends to the respective structures, lumber width indicating means carried by one of the lazy tongs, a plurality of stops movably mounted upon the other lazy tongs, parallel bars connected at one end to one of the lazy tongs and, adjacent their other ends to the respective stops, separate key operated means for supporting said bars adjacent the stops and for elevating the bars and stops, adding mechanism, and a structure limited in movement by an elevated stop for actuating said mechanism.

42. The combination with separate structures, and means for shifting one of the structures, of parallel lazy tongs each connected at its ends to the respective structures, lumber width indicating means carried by one of the lazy tongs, a plurality of stops movably mounted upon the other lazy tongs, parallel bars connected at one end to one of the lazy tongs and, adjacent their other ends to the respective stops, separate key operated means for supporting said bars adjacent the stops and for elevating the bars and stops, a locking dog combined with each bar, said dogs being movable upwardly with the bars and into engagement with one of the structures to hold the stops in raised positions, adding mechanism, and means limited in movement by an elevated stop for actuating the adding mechanism.

43. The combination with separate structures, and means for shifting one of the structures, of parallel lazy tongs each connected at its ends to the respective structures, lumber width indicating means carried by one of the lazy tongs, a plurality of stops movably mounted upon the other lazy tongs, parallel bars connected at one end to one of the lazy tongs and, adjacent their other ends to the respective stops, separate key operated means for supporting said bars adjacent the stops and for elevating the bars and stops, a locking dog combined with each bar, said dogs being movable upwardly with the bars and into engagement with one of the structures to hold the stops in raised positions, adding mechanism, means limited in movement by an elevated stop for actuating the adding mechanism, and means for engaging an elevated dog and disengaging it from the structure engaged thereby to release the elevated stop and its bar.

44. The combination with separate structures, and means for shifting one of the structures, of parallel lazy tongs each connected at its ends to the respective structures, lumber width indicating means carried by one of the lazy tongs, a plurality of stops movably mounted upon the other lazy tongs, parallel bars connected at one end to one of the lazy tongs and, adjacent their other ends to the respective stops, separate key operated means for supporting said bars adjacent the stops and for elevating the bars and stops, a locking dog combined with each bar, said dogs being movable upwardly with the bars and into engagement with one of the structures to hold the stops in raised positions, adding mechanism, means limited in movement by an elevated stop for actuating the adding mechanism, means for engaging an elevated dog and disengaging it from the structure engaged thereby to release the elevated stop and its bar, and means for automatically returning the stop and bar to their normal positions when released.

45. The combination with separate structures, means for shifting one of the structures, of separate lazy tongs each connected at its ends to the respective structures, means carried by one of the lazy tongs for indicating lumber widths, stops carried by the other lazy tongs and movable therewith to vary the distances between the stops, bars connecting the lazy tongs and carrying the respective stops, key operated means for shifting the respective bars to elevate their stops, said means being slidably engaged by but operatively connected to the bars, adding mechanism, and a slidable structure limited in its movement by an elevated stop for actuating said mechanism.

46. The combination with separate structures, means for shifting one of the structures, of separate lazy tongs each connected at its ends to the respective structures, means carried by one of the lazy tongs for indicating lumber widths, stops carried by the other lazy tongs and movable therewith to vary the distance between the stops, bars connecting the lazy tongs and carrying the respective stops, key operated means for shifting the respective bars to elevate their stops, said means being slidably engaged by but operatively connected to the bars, adding mechanism, a slidable structure limited in its movement by an elevated stop for actuating said mechanism, a coupling bar operatively connected to all of said key actuated means, means for locking said bar and the key actuated means against movement, and means operated by the slidable structure when shifted to one limit of its movement for releasing the coupling bar.

47. The combination with separate structures, means for shifting one of the structures, of separate lazy tongs each connected at its ends to the respective structures, means carried by one of the lazy tongs for indicating lumber widths, stops carried by the other lazy tongs and movable therewith to vary the distances between the stops, bars connecting the lazy tongs and carrying the respective stops, key operated means for shifting the respective bars to elevate their stops, said means being slidably engaged by but operatively connected to the bars, adding mechanism, a slidable structure limited in its movement by an elevated stop for actuating said mechanism, and tally mechanism controlled by each of the key operated means.

48. The combination with a main frame and parallel guides thereon, of a slidable frame engaging the guides, lazy tongs each fastened at one end to the main frame and at its other end to the slidable frame, means for shifting the slidable frame, lumber width indicating means carried by one of the lazy tongs, a longitudinal series of stops carried by the other lazy tongs, parallel key operated rods, bars connecting the lazy tongs and supporting the stops, means slidably connected to the respective rods for actuating the respective bars to elevate the stops, a dog carried by each bar, means for automatically shifting the dog into engagement with a part of the main frame when the bar is elevated, adding mechanism, and means movable against an elevated stop to actuate the adding mechanism.

49. The combination with a main frame and parallel guides thereon, of a slidable frame engaging the guides, lazy tongs each fastened at one end to the main frame and at its other end to the slidable frame, means for shifting the slidable frame, lumber width indicating means carried by one of the lazy tongs, a longitudinal series of stops carried by the other lazy tongs, parallel key operated rods, bars connecting the lazy tongs and supporting the stops, means slidably connected to the respective rods for actuating the respective bars to elevate the stops, a dog carried by each bar, means for automatically shifting the dog into engagement with a part of the main frame when the bar is elevated, adding mechanism, means movable against an elevated stop to actuate the adding mechanism, and means movable relative to the main frame for engaging an elevated dog to shift it out of engagement with said frame.

50. The combination with a main frame and parallel guides thereon, of a slidable frame engaging the guides, lazy tongs each fastened at one end to the main frame and at its other end to the slidable frame, means for shifting the slidable frame, lumber width indicating means carried by one of the lazy tongs, a longitudinal series of stops carried by the other lazy tongs, parallel key operated rods, bars connecting the lazy tongs, and supporting the stops, means slidably connected to the respective rods for actuating the respective bars to elevate the stops, a dog carried by each bar, means for automatically shifting the dog into engagement with a part of the main frame when the bar is elevated, adding mechanism, means movable against an elevated stop to actuate the adding mechanism, means movable relative to the main frame for engaging an elevated dog to shift it out of engagement with said frame, a coupling bar actuated by any one of the key operated rods, and resilient means connected to the coupling bar for returning the released stops and the coöperating parts to their initial positions.

51. The combination with key operated rods, relatively adjustable stops, and means operated by any one of the rods for elevating a stop, of a revoluble element, an actuating device limited in its movement by an elevated stop, a connection between said device and the revoluble element to rotate said element, adding mechanism, a coupling bar shiftable by any one of the key operated rods, and means actuated by the coupling bar for connecting the revoluble element to the adding mechanism.

52. The combination with relatively adjustable stops and separate key actuated rods, of a spring controlled coupling bar, coöperating means upon said bar and the respective rods for transmitting motion from any one of the rods to the bar, means for normally holding the bar against movement, means operated by the respective rods for shifting the stops to active positions, a slidable element, means operated thereby when brought to one limit of its movement for releasing the coupling bar to permit actuation of the key operated rods, a revoluble element connected to and actuated by said shiftable slidable element, adding mechanism, means operated by the released coupling bar under the action of any one of the key operated rods for coupling the rotating element to the adding mechanism, said slidable element being limited in its movement in one direction by an elevated stop.

53. The combination with key operated rods and a coupling bar operatively connected to and adapted to be actuated by any one of the rods, of means for holding the bar and rods against movement, adjustably connected stops, a carriage, means operated by the carriage when brought to one limit of its movement for unlocking the bar to permit rotation of the rods, means operated by any one of the rods when rotated for elevating one of the stops into the path of the carriage, means for automatically locking the stop in elevated position, a revoluble element connected to and actuated by the carriage, adding mechanism, and means operated by the coupling bar under the action of any one of the rods for coupling the revoluble element to the adding mechanism.

54. The combination with key operated rods and a coupling bar operatively connected to and adapted to be actuated by any one of the rods, of means for holding the bar and rods against movement, adjustably connected stops, a carriage, means operated by the carriage when brought to one limit of its movement for unlocking the bar to permit rotation of the rods, means operated by any one of the rods when rotated for elevating one of the stops into the path of the carriage, means for automatically locking the stop in elevated position, a revoluble element connected to and actuated by the carriage, adding mechanism, means operated by the coupling bar under the action of any one of the rods for coupling the revoluble element to the adding mechanism, and means upon the carriage for unlocking the elevated stop and the parts connected thereto.

55. The combination with key operated rods and a coupling bar operatively connected to and adapted to be actuated by any one of the rods, of means for holding the bar and rods against movement, adjustably connected stops, a carriage, means operated by the carriage when brought to one limit of its movement for unlocking the bar to permit rotation of the rods, means operated by any one of the rods when rotated for elevating one of the stops into the path of the carriage, means for automatically locking the stop in elevated position, a revoluble element connected to and actuated by the carriage, adding mechanism, means operated by the coupling bar under the action of any one of the rods for coupling the revoluble element to the adding mechanism, and means for automatically locking the coupling bar when the carriage is removed therefrom and the stop is unlocked.

56. The combination with key operated rods and a coupling bar operatively connected to and adapted to be actuated by any one of the rods, of means for holding the bar and rods against movement, adjustably connected stops, a carriage, means operated by the carriage when brought to one limit of its movement for unlocking the bar to permit rotation of the rods, means operated by any one of the rods when rotated for elevating one of the stops into the path of the carriage, means for automatically locking the stop in elevated position, a revoluble element connected to and actuated by the carriage, adding mechanism, means operated by the coupling bar under the action of any one of the rods for coupling the revoluble element to the adding mechanism, means upon the carriage for unlocking the elevated stop and the parts connected thereto, and means for automatically locking the coupling bar against movement when the stop is unlocked.

57. The combination with key operated rods and a coupling bar operatively connected to and adapted to be actuated by any one of the rods, of means for holding the bar and rods against movement, adjustably connected stops, a carriage, means operated by the carriage when brought to one limit of its movement for unlocking the bar to permit rotation of the rods, means operated by any one of the rods when rotated for elevating one of the stops into the path of the carriage, means for automatically locking the stop in elevated position, a revoluble element connected to and actuated by the carriage, adding mechanism, means operated by the coupling bar under the action of any one of the rods for coupling the revoluble element to the adding mechanism, means upon the carriage for unlocking the elevated stop and the parts connected thereto, means for automatically locking the coupling bar when the stop is unlocked, means restrained by the held coupling bar for holding the adding mechanism against movement.

58. The combination with adding mechanism, a revoluble element adjacent thereto, and a plurality of stops adjustable relative to each other, of key operated rods, a coupling bar operatively connected to and adapted to be actuated by any one of said rods, yielding means for holding the coupling bar in a predetermined position, means engaged by the coupling bar when in its normal position for holding the adding mechanism against movement, means for locking the coupling bar in its normal position, a carriage movable against said means to release the coupling bar, separate means operated by the respective rods when the coupling bar is released for elevating the respective stops to limit the movement of the carriage in one direction, means operated by such movement of the rods to couple the revoluble element to the adding mechanism, and to shift the holding means of the adding mechanism to inactive position, and means operated by the movement of the carriage against the elevated stop for actuating the revoluble element.

59. The combination with parallel lazy tongs and means for simultaneously extending or retracting the same, of lumber width indicating means carried by one of the lazy tongs, a plurality of stops carried by the other lazy tongs, of adding mechanism, means for holding said mechanism normally against movement, a revoluble element, key operated rods, a coupling bar operatively connected to and adapted to be actuated by any one of the rods, means carried by said bar for engaging the holding means of the adding mechanism to hold it normally in active position, means for locking the bar against movement, a carriage movable in one direction to release the bar and permit rotation of the key actuated rods, means for transmitting motion from said carriage to the revoluble element, means operated by any one of the key actuated rods when rotated for shifting the coupling bar to release the adding mechanism, additional means operated by said rods for coupling the revoluble element to the adding mechanism, and additional means operated by the released key actuated rod for elevating a stop into the path of the carriage to limit the movement of said carriage during the actuation of the adding mechanism.

60. The combination with parallel lazy tongs and means for simultaneously extending or retracting the same, of lumber width indicating means carried by one of the lazy tongs, a plurality of stops carried by the other lazy tongs, of adding mechanism, means for holding said mechanism normally against movement, a revoluble element, key operated rods, a coupling bar operatively connected to and adapted to be actuated by any one of the rods, means carried by said bar for engaging the holding means of the adding mechanism to hold it normally in active position, means for locking the bar against movement, a carriage movable in one direction to release the bar and permit rotation of the key actuated rods, means for transmitting motion from said carriage to the revoluble element, means operated by any one of the key actuated rods when rotated for shifting the coupling bar to release the adding mechanism, additional means operated by said rods for coupling the revoluble element to the adding mechanism, additional means operated by the released key actuated rod for elevating a stop into the path of the carriage to limit the movement of said carriage during the actuation of the adding mechanism, means for locking the elevated stop in active position, means for automatically releasing said locking means and the stop when the carriage is brought to position against the stop, and means for automatically locking the coupling bar against movement when the stop is released.

61. In a machine of the class described, the combination with adding mechanism including a wheel, means for holding the wheel against rotation, and a revoluble element, of separate means under the control of a single key for simultaneously releasing the wheel and coupling it to the revoluble element respectively, and tally mechanism for registering the movement of the key.

In testimony that we claim the foregoing as our own we have hereto affixed our signatures in the presence of two witnesses.

JOSEPH WILLIAM HALEY.
CHARLES BRAMBLE YELTON.

Witnesses:
W. A. PRICE,
M. J. CORBIN.